United States Patent
Ronen et al.

(10) Patent No.: US 12,422,680 B2
(45) Date of Patent: Sep. 23, 2025

(54) OPTICAL SYSTEMS INCLUDING LIGHT-GUIDE OPTICAL ELEMENTS WITH TWO-DIMENSIONAL EXPANSION

(71) Applicant: Lumus Ltd., Ness Ziona (IL)

(72) Inventors: Eitan Ronen, Rechovot (IL); Ronen Chriki, Lod (IL); Tsion Eisenfeld, Ashkelon (IL)

(73) Assignee: Lumus Ltd., Ness Ziona (IL)

( * ) Notice: Subject to any disclaimer, the term of this patent is extended or adjusted under 35 U.S.C. 154(b) by 9 days.

(21) Appl. No.: 18/403,794

(22) Filed: Jan. 4, 2024

(65) Prior Publication Data
US 2024/0134202 A1    Apr. 25, 2024

Related U.S. Application Data

(63) Continuation of application No. 17/422,491, filed as application No. PCT/IL2020/051354 on Dec. 30, 2020, now Pat. No. 11,885,966.

(60) Provisional application No. 63/005,367, filed on Apr. 5, 2020, provisional application No. 62/954,744, filed on Dec. 30, 2019.

(51) Int. Cl.
    G02B 27/01    (2006.01)
    F21V 8/00     (2006.01)

(52) U.S. Cl.
    CPC ....... *G02B 27/0172* (2013.01); *G02B 6/0018* (2013.01); *G02B 2027/0178* (2013.01)

(58) Field of Classification Search
    CPC .................................................. G02B 27/0172
    See application file for complete search history.

(56) References Cited

U.S. PATENT DOCUMENTS

| | | | |
|---|---|---|---|
| 7,457,040 B2 | 11/2008 | Amitai | |
| 10,241,346 B2* | 3/2019 | Tervo | G02B 27/4272 |
| 10,409,066 B2 | 9/2019 | Shih et al. | |
| 10,481,319 B2 | 11/2019 | Danziger et al. | |
| 10,551,544 B2 | 2/2020 | Danziger et al. | |
| 11,249,237 B2 | 2/2022 | Nakamura et al. | |
| 11,885,966 B2* | 1/2024 | Ronen | G02B 27/0172 |
| 2007/0188837 A1* | 8/2007 | Shimizu | G02B 27/0172 359/13 |
| 2020/0310024 A1* | 10/2020 | Danziger | G02B 27/0081 |
| 2021/0055561 A1 | 2/2021 | Danziger et al. | |

* cited by examiner

*Primary Examiner* — Charlie Y Peng
(74) *Attorney, Agent, or Firm* — Rivka Friedman

(57) ABSTRACT

An optical system provides two-stage expansion of an input optical aperture for a display based on a light-guide optical element. A first expansion is achieved using two distinct sets of mutually-parallel partially-reflecting surfaces, each set handing a different part of an overall field-of-view presented to the eye. In some cases, a single image projector provides image illumination to two sets of facets that are integrated into the LOE. In other cases, two separate projectors deliver image illumination corresponding to two different parts of the field-of-view to their respective sets of facets.

11 Claims, 36 Drawing Sheets

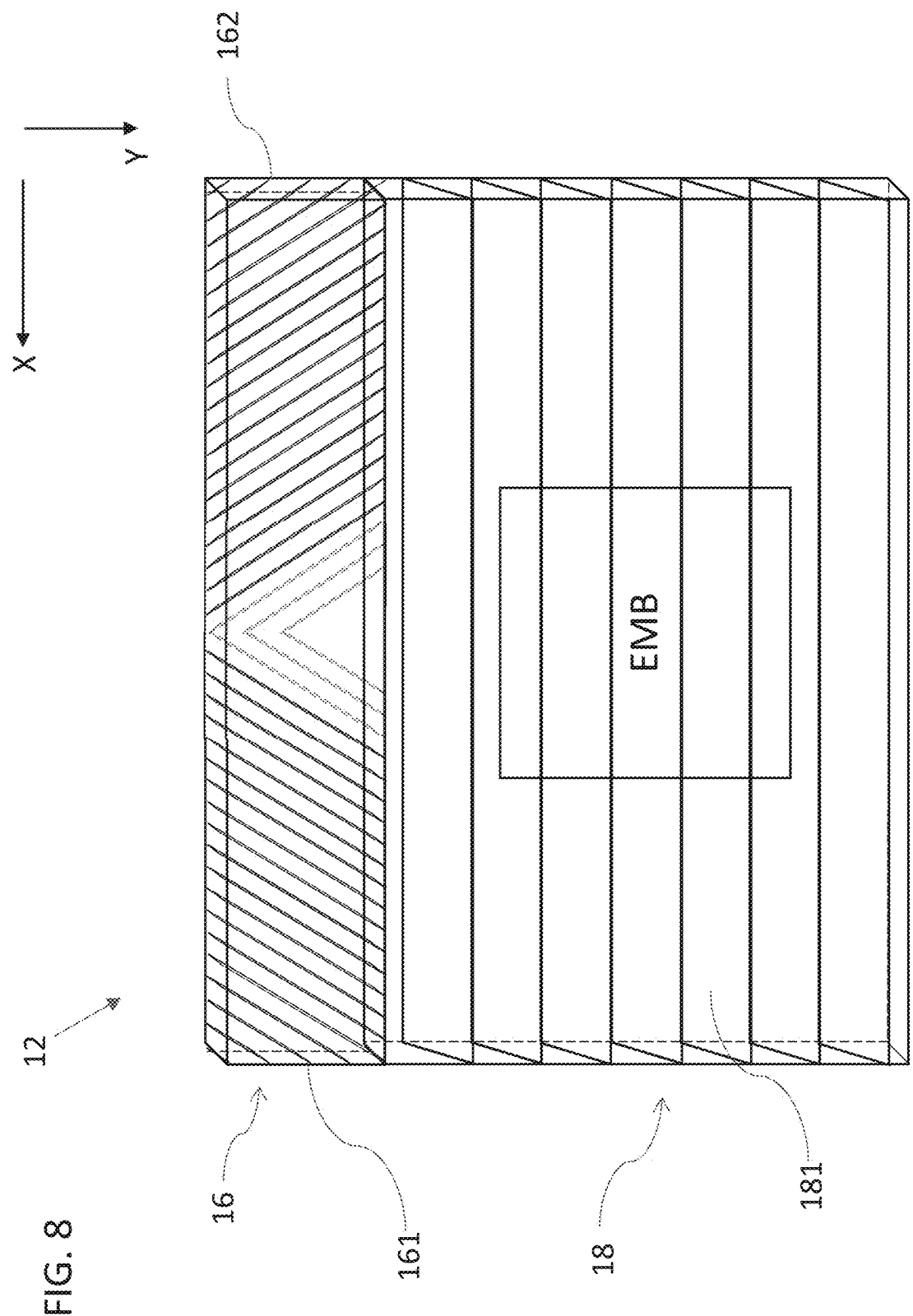

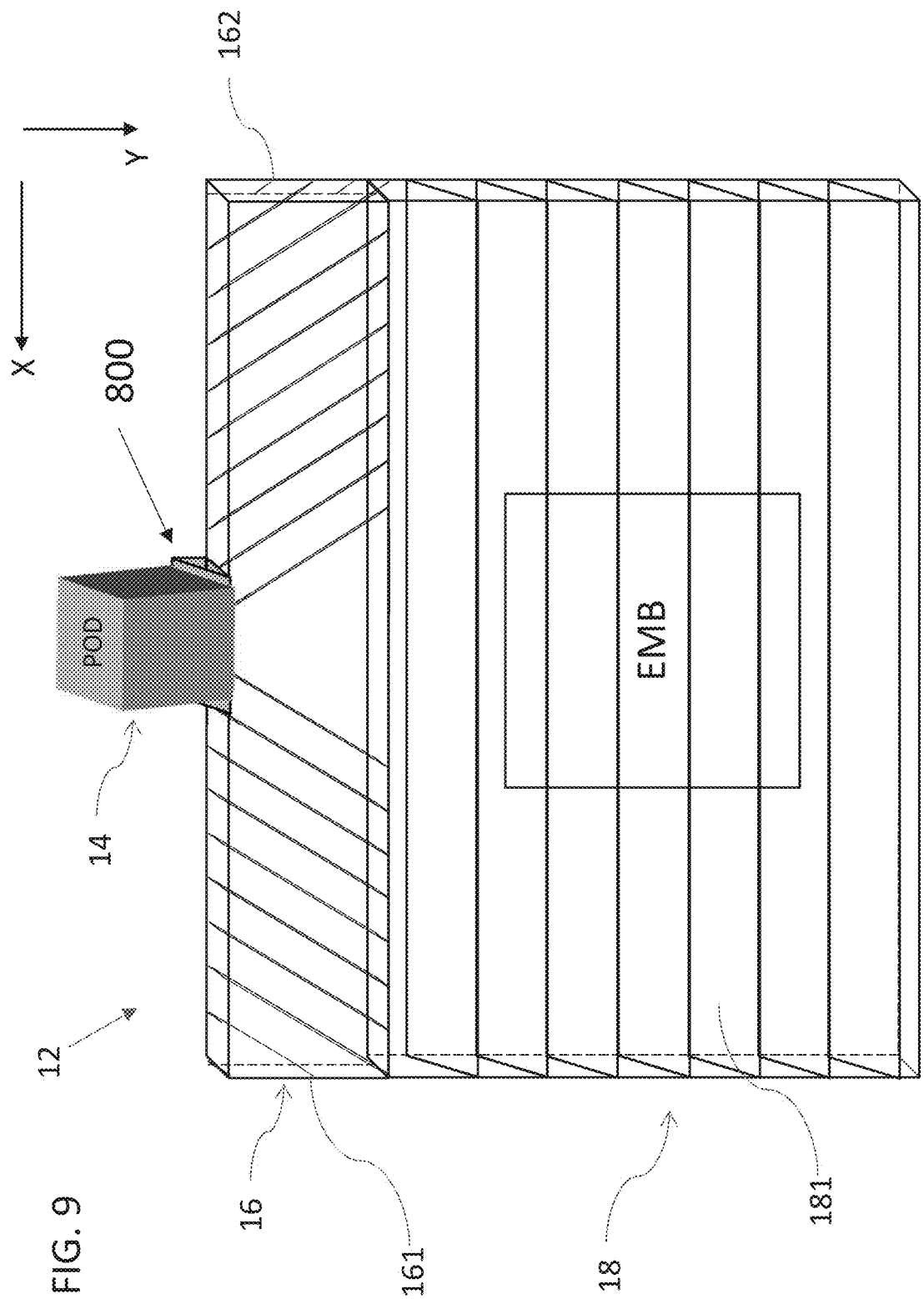

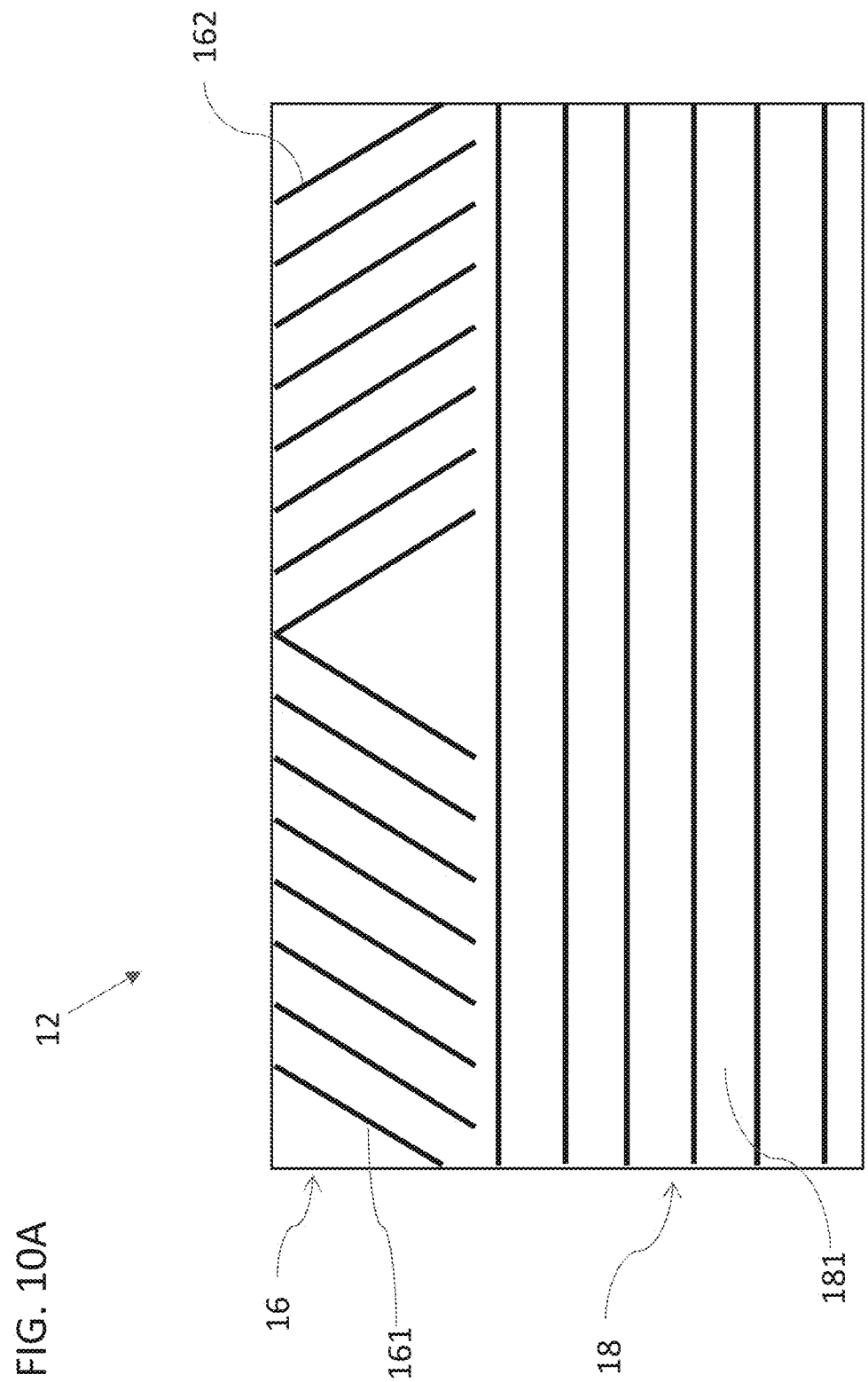

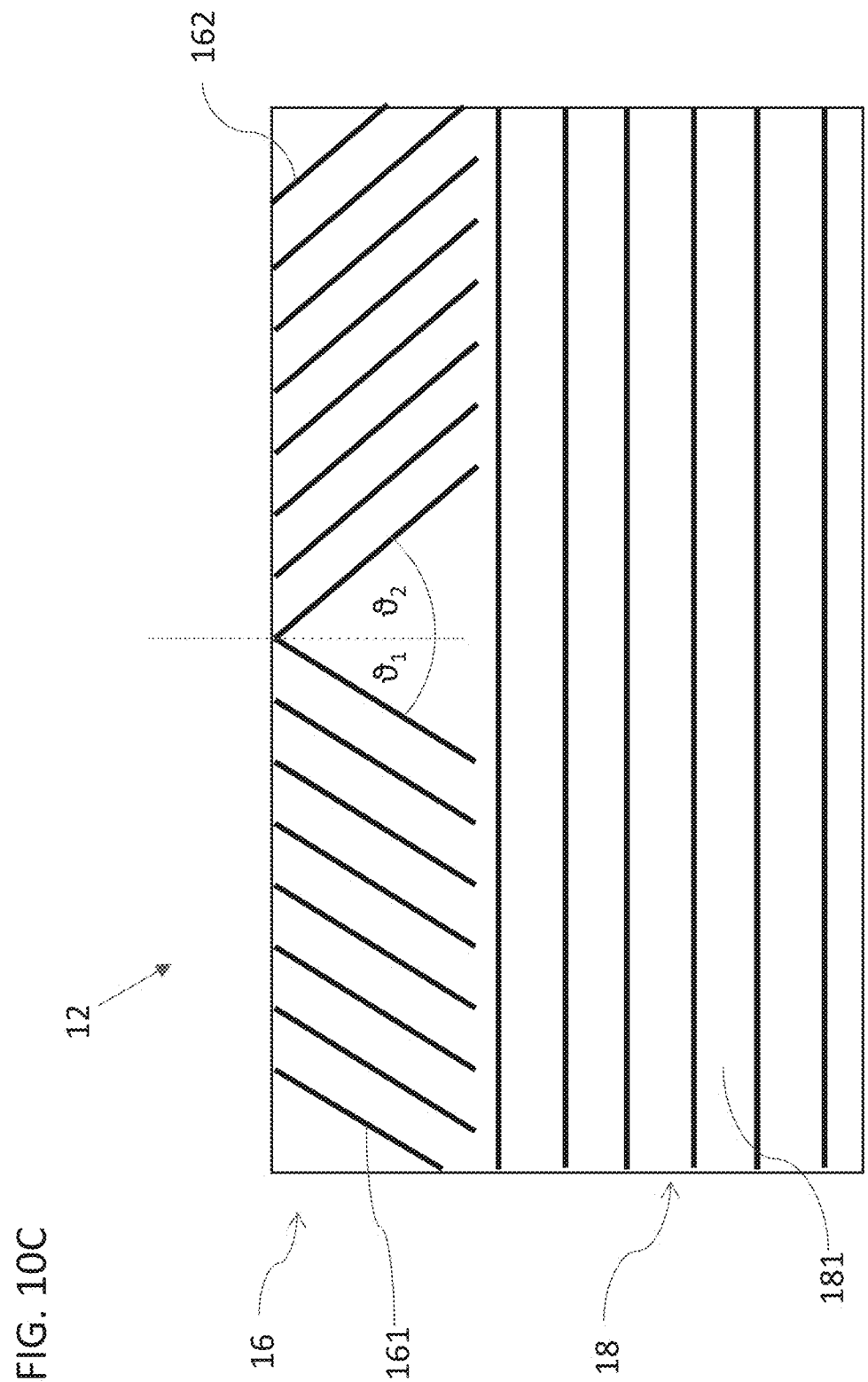

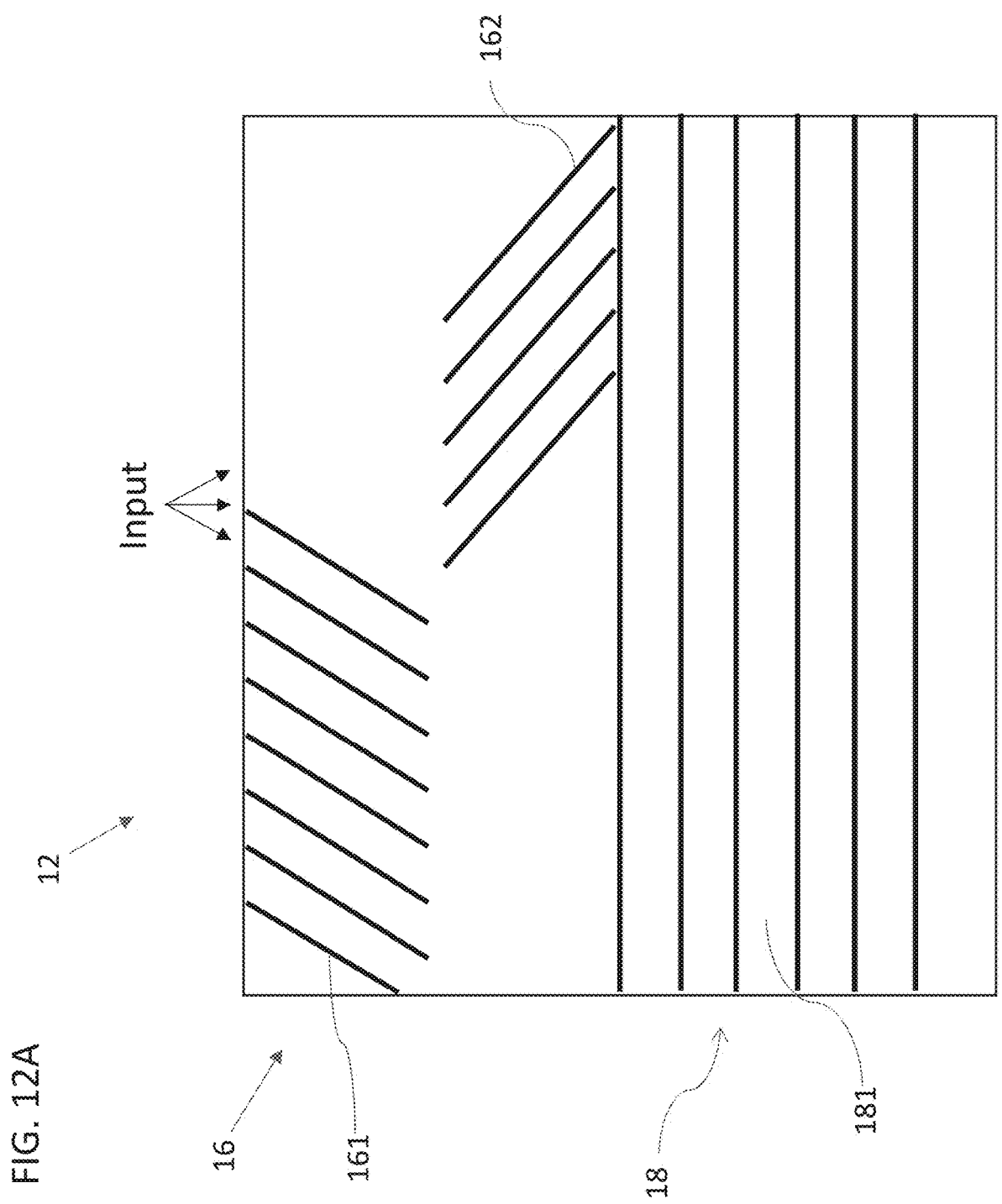

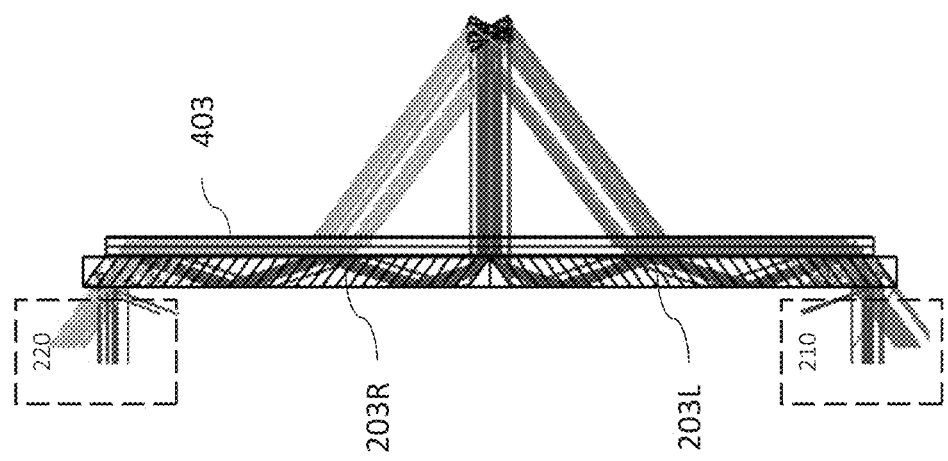
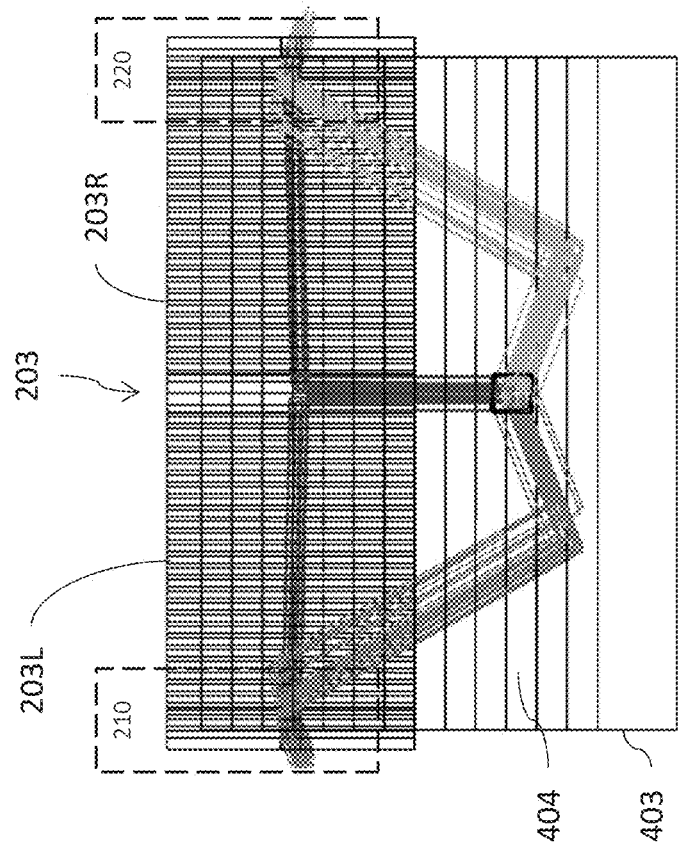
FIG. 20B
FIG. 20A

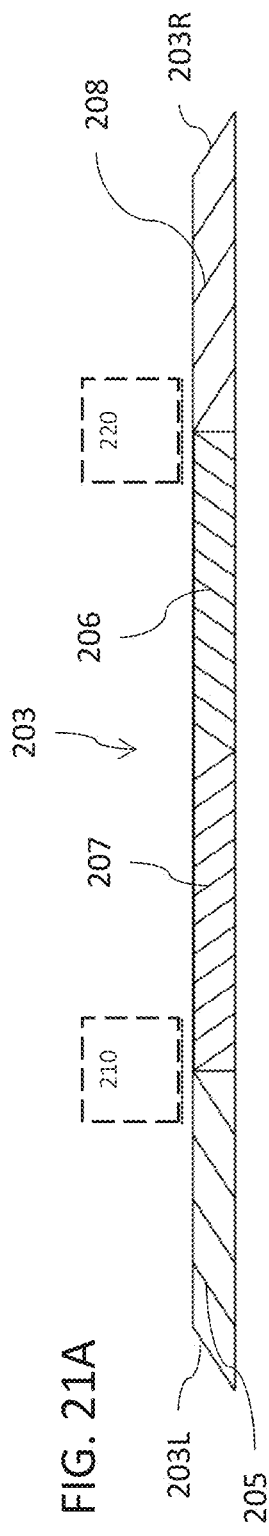
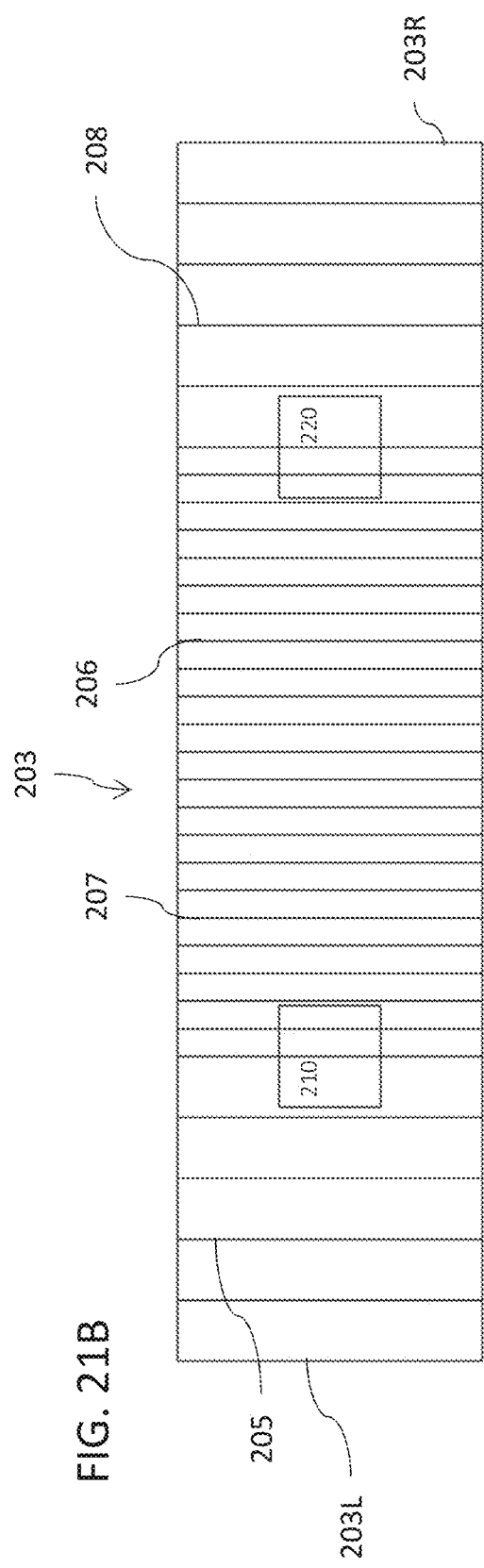

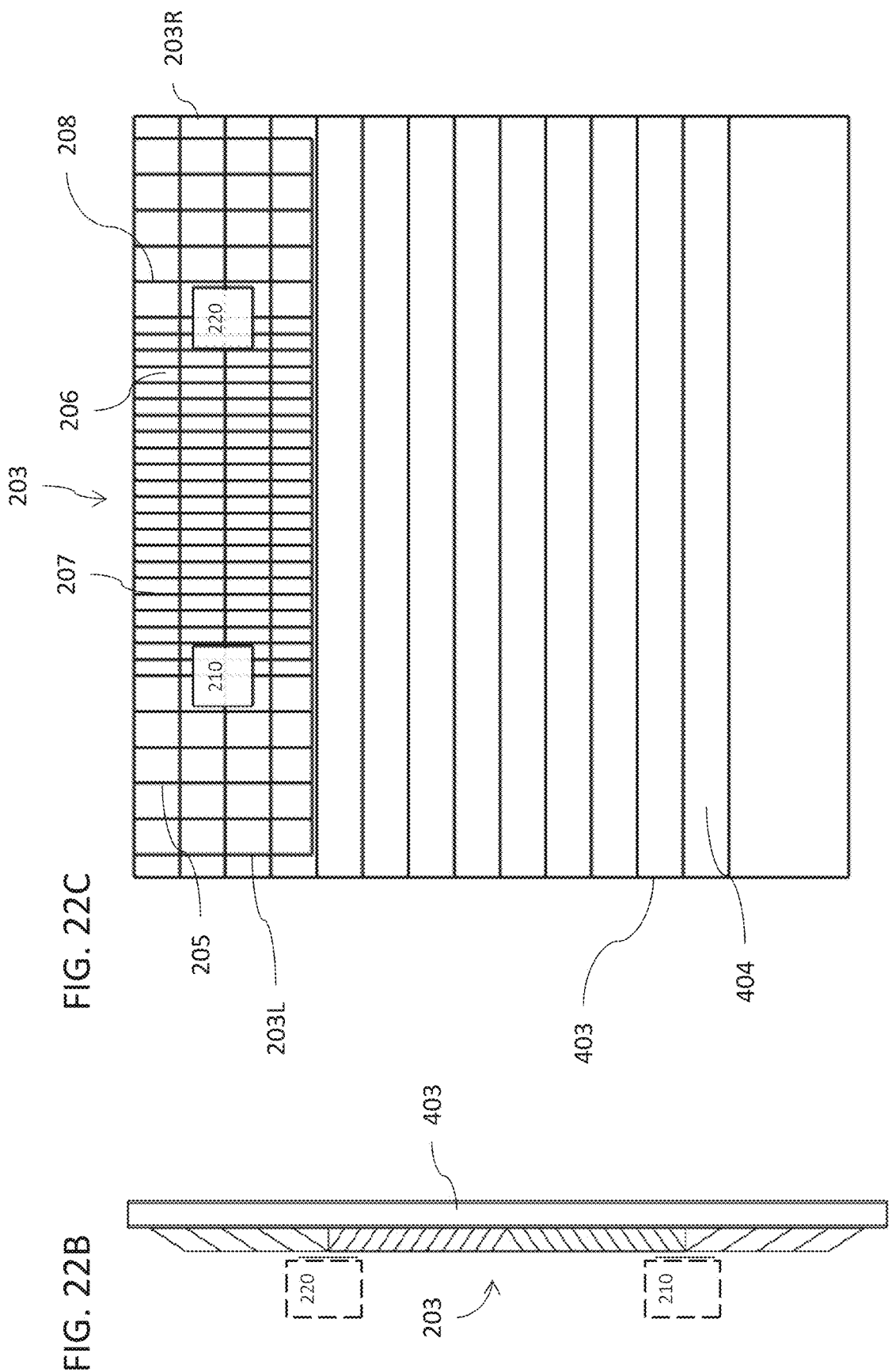

OPTICAL SYSTEMS INCLUDING LIGHT-GUIDE OPTICAL ELEMENTS WITH TWO-DIMENSIONAL EXPANSION

FIELD AND BACKGROUND OF THE INVENTION

The present invention relates to optical systems and, in particular, it concerns an optical system including a light-guide optical element (LOE) for achieving optical aperture expansion.

Many near-eye display systems include a transparent light-guide optical element (LOE) or "waveguide" placed before the eye of the user, which conveys an image within the LOE by internal reflection and then couples out the image by a suitable output coupling mechanism towards the eye of the user. The output coupling mechanism may be based on embedded partial reflectors or "facets", or may employ a diffractive element. The description below will refer primarily to a facet-based coupling-out arrangement.

SUMMARY OF THE INVENTION

The present invention is an optical system for directing image illumination to an eye-motion box for viewing by an eye of a user.

According to the teachings of an embodiment of the present invention there is provided, an optical system for directing image illumination injected into at least one coupling-in region to an eye-motion box for viewing by an eye of a user, the optical system comprising a light-guide optical element (LOE) formed from transparent material, the LOE comprising: (a) a first region containing a first set of planar, mutually-parallel, partially-reflecting surfaces having a first orientation; (b) the first region further containing a second set of planar, mutually-parallel, partially-reflecting surfaces having a second orientation non-parallel to the first orientation; (c) a second region containing a third set of planar, mutually-parallel, partially-reflecting surfaces having a third orientation non-parallel to each of the first orientation and the second orientation; (d) a set of mutually-parallel major external surfaces, the major external surfaces extending across the first and second regions such that the first set of partially-reflecting surfaces, the second set of partially-reflecting surfaces and the third set of partially-reflecting surfaces are all located between the major external surfaces, wherein the third set of partially-reflecting surfaces are at an oblique angle to the major external surfaces so that a part of the image illumination propagating within the LOE by internal reflection at the major external surfaces from the first region into the second region is coupled out of the LOE towards the eye-motion box, and wherein each of the first and second sets of partially-reflecting surfaces is oriented so that a part of the image illumination propagating within the LOE by internal reflection at the major external surfaces from the at least one coupling-in region is deflected towards the second region.

According to a further feature of an embodiment of the present invention, the first set of partially-reflecting surfaces deflects a first part of a field of view of the image towards the second region and the second set of partially-reflecting surfaces deflects a second part of the field of view of the image towards the second region, the first and second parts of the field of view combining to provide a continuous combined field of view larger than each of the first and second parts.

According to a further feature of an embodiment of the present invention, each of the first and second sets of partially-reflecting surfaces includes a deflection surface configured to reflect a majority of the image illumination incident on the deflection surface, the deflection surface being deployed to be the first partially-reflecting surface of each of the first and second sets of partially-reflecting surfaces reached by the image illumination injected into the at least one coupling-in region.

According to a further feature of an embodiment of the present invention, the deflection surface of the first set of partially-reflecting surfaces and the deflection surface of the second set of partially-reflecting surfaces meet at a line.

According to a further feature of an embodiment of the present invention, each of the first and second sets of partially-reflecting surfaces includes a filler surface adjacent to the deflection surface, the filler surface having a length measured parallel to the major external surfaces that is smaller than a length of the deflection surface and smaller than a length of another partially-reflecting surface adjacent to the filler surface.

According to a further feature of an embodiment of the present invention, the first and second sets of partially-reflecting surfaces each have a non-uniform spacing between the partially-reflecting surfaces.

According to a further feature of an embodiment of the present invention, each of the partially-reflecting surfaces of the first and second sets of partially-reflecting surfaces has a length measured parallel to the major external surfaces, each of the first and second sets of partially-reflecting surfaces including partially-reflecting surfaces having differing lengths.

According to a further feature of an embodiment of the present invention, the coupling-in region is in a middle third of a dimension of the LOE.

According to a further feature of an embodiment of the present invention, at least one edge of the LOE adjacent to the first region of the LOE is implemented as a mirror surface perpendicular to the major external surfaces, and wherein a path of the image illumination from the coupling-in region to the second region of the LOE includes at least one reflection from the mirror surface of the at least one edge of the LOE.

According to a further feature of an embodiment of the present invention, there is also provided an image projector configured to project image illumination corresponding to a collimated image, the image projector being optically coupled to the LOE at the coupling-in region so as to inject the image illumination into the first region of the LOE so as to propagate within the LOE by internal reflection at the major external surfaces, the image illumination being injected with an effective optical aperture and an effective direction of propagation so as to be incident on partially-reflecting surfaces of both the first set of partially-reflecting surfaces and the second set of partially-reflecting surfaces.

According to a further feature of an embodiment of the present invention, a dimension of the first set of partially-reflecting surfaces perpendicular to the effective direction of propagation is greater than a dimension of the second set of partially-reflecting surfaces perpendicular to the effective direction of propagation.

According to a further feature of an embodiment of the present invention, an angle formed between the partially-reflecting surfaces of the first set of partially-reflecting surfaces and the effective direction of propagation is smaller than an angle formed between the partially-reflecting surfaces of the second set of partially-reflecting surfaces and the effective direction of propagation.

According to a further feature of an embodiment of the present invention, there is also provided a first image projector configured to project image illumination corresponding to a first part of a collimated image, the first image projector being optically coupled to the LOE at a first coupling-in region so as to inject the image illumination into the first region of the LOE so as to propagate within the LOE by internal reflection at the major external surfaces and to be incident on partially-reflecting surfaces of the first set of partially-reflecting surfaces, and a second image projector configured to project image illumination corresponding to a second part of the collimated image, the second image projector being optically coupled to the LOE at a second coupling-in region so as to inject the image illumination into the first region of the LOE so as to propagate within the LOE by internal reflection at the major external surfaces and to be incident on partially-reflecting surfaces of the second set of partially-reflecting surfaces, the first and second parts of the collimated image combining at the eye-motion box to provide a combined image.

According to a further feature of an embodiment of the present invention, the first and second sets of partially-reflecting surfaces are perpendicular to the major external surfaces of the LOE.

According to a further feature of an embodiment of the present invention, the first and second sets of partially-reflecting surfaces are oblique to the major external surfaces of the LOE.

There is also provided according to the teachings of an embodiment of the present invention, an optical system for delivering an image to an eye-motion box for viewing by an eye of a user, the optical system comprising: (a) a light-guide optical element (LOE) formed from transparent material, the LOE comprising an out-coupling set of planar, mutually-parallel, partially-reflecting surfaces and a set of mutually-parallel major external surfaces, the out-coupling set of partially-reflecting surfaces being located between the major external surfaces; (b) a first image projector configured to project image illumination corresponding to a first part of a collimated image from an optical aperture, the image illumination following a first light path from the optical aperture into the LOE so as to propagate within the LOE by internal reflection at the major external surfaces and to be progressively coupled-out from the LOE by the out-coupling set of partially-reflecting surfaces towards the eye-motion box; (c) a second image projector configured to project image illumination corresponding to a second part of a collimated image from an optical aperture, the image illumination following a second light path from the optical aperture into the LOE so as to propagate within the LOE by internal reflection at the major external surfaces and to be progressively coupled-out from the LOE by the out-coupling set of partially-reflecting surfaces towards the eye-motion box, the first and second parts of the collimated image combining at the eye-motion box to provide a combined image; (d) a first optical expansion component comprising a first set of planar, mutually-parallel, partially-reflecting surfaces having a first orientation, the first optical expansion component being deployed in the first light path so as to expand the optical aperture of the first image projector and to direct the image light towards the out-coupling set of partially-reflecting surfaces; and (e) a second optical expansion component comprising a second set of planar, mutually-parallel, partially-reflecting surfaces having a second orientation, the second optical expansion component being deployed in the second light path so as to expand the optical aperture of the second image projector and to direct the image light towards the out-coupling set of partially-reflecting surfaces.

According to a further feature of an embodiment of the present invention, the first optical expansion component and the second optical expansion component are external components optically coupled to the LOE, and wherein injection of the image illumination from the first and second image projectors into the LOE occurs through the first and second optical expansion components, respectively.

According to a further feature of an embodiment of the present invention, the first and second optical expansion components are each implemented in a slab having two major surfaces, wherein one of the major surfaces is optically coupled to a coupling-in surface associated with the LOE.

According to a further feature of an embodiment of the present invention, the coupling-in surface is obliquely angled relative to the major external surfaces of the LOE.

According to a further feature of an embodiment of the present invention, the slab of the first optical expansion component is optically coupled to a first coupling-in surface associated with the LOE and the slab of the second optical expansion component is optically coupled to a second coupling-in surface associated with the LOE, the first and second coupling-in surfaces being non-coplanar.

According to a further feature of an embodiment of the present invention, the coupling-in surface is coplanar with, or parallel to, one of the major external surfaces of the LOE, and wherein the LOE includes at least one at least partially reflecting coupling-in surface.

According to a further feature of an embodiment of the present invention, the first set of partially-reflecting surfaces and the second set of partially-reflecting surfaces are located within the LOE between the major external surfaces of the LOE.

According to a further feature of an embodiment of the present invention, the first and second sets of partially-reflecting surfaces are perpendicular to the major external surfaces of the LOE.

According to a further feature of an embodiment of the present invention, the first and second sets of partially-reflecting surfaces are oblique to the major external surfaces of the LOE.

According to a further feature of an embodiment of the present invention, the first optical expansion component further comprises a third set of mutually-parallel partially-reflecting surfaces non-parallel to the first set of partially-reflecting surfaces, the first and third sets of partially reflecting surfaces expanding the optical aperture of the first image projector in opposite directions and directing the image light towards the out-coupling set of partially-reflecting surfaces.

According to a further feature of an embodiment of the present invention, the first image projector has a central optical axis, and wherein the third set of partially-reflecting surfaces has an inclination relative to the central optical axis different from an inclination of the first set of partially-reflecting surfaces to the central axis.

BRIEF DESCRIPTION OF THE DRAWINGS

The invention is herein described, by way of example only, with reference to the accompanying drawings, wherein:

FIG. 8 is a schematic representation of an alternative implementation of the LOE of FIG. 2;

FIG. 9 is a further schematic representation of the LOE of FIG. 2 illustrating coupling of an image projector to the LOE via a wedge prism;

FIGS. 10A-10C are schematic representations of relative deployment of partially-reflecting surfaces within the LOE of FIG. 2 showing a symmetrical arrangement, an off-center coupling-in region, and asymmetric inclination of the surfaces, respectively;

FIGS. 12A and 12B are schematic representations of further variant implementations of the LOE of FIG. 2 in which first and second sets of partially-reflecting surfaces are subdivided between two segments of the LOE;

FIGS. 20A-20C are a front view, a top view and a side view, respectively, of a further variant of the optical system of FIG. 16A illustrating optical coupling of the optical aperture expansion components to a major external surface of the LOE;

FIGS. 21A-21C are a top, front and side view, respectively, of optical aperture expansion components according to a variant implementation of the optical system of FIGS. 20A-20C; and FIGS. 22A-22C are a side, top and front view, respectively, of an optical system employing the optical aperture expansion components of FIGS. 21A-21C.

DESCRIPTION OF THE PREFERRED EMBODIMENTS

Figure 1A:
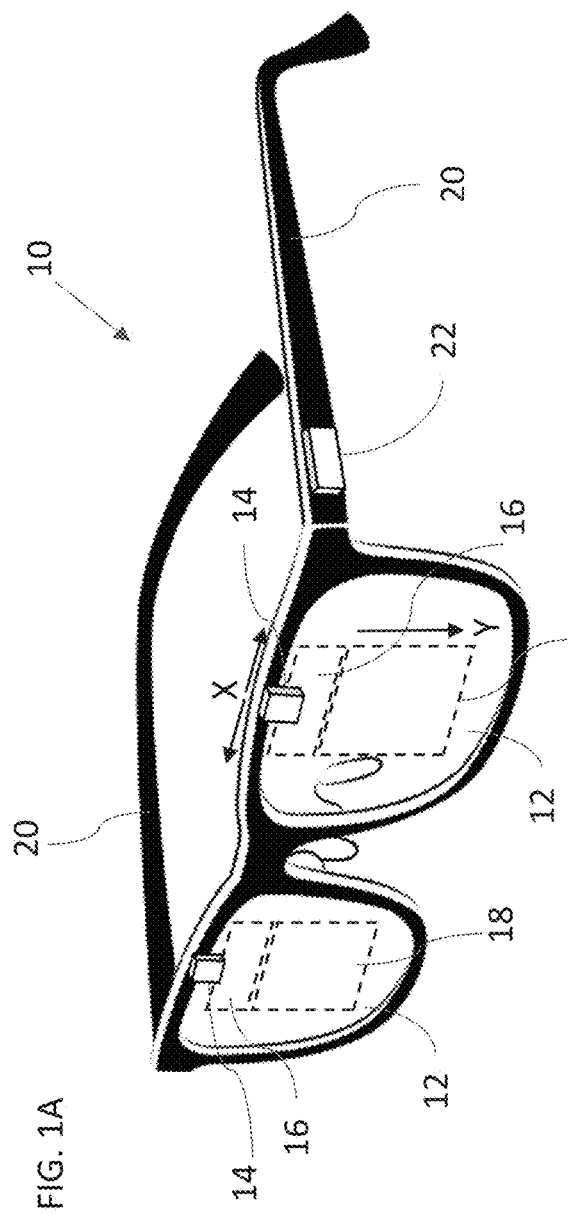
FIGS. 1A and 1B are schematic isometric views of an optical system implemented using a light-guide optical element (LOE), constructed and operative according to the teachings of a first aspect of the present invention, illustrating a top-down and a side-injection configuration, respectively.

The present invention is an optical system for directing image illumination to an eye-motion box for viewing by an eye of a user.

The principles and operation of optical systems according to the present invention may be better understood with reference to the drawings and the accompanying description.

By way of introduction, certain aspects of the present invention relate to an optical system for directing image illumination via a light-guide optical element (LOE) to an eye-motion box (EMB) for viewing by an eye of a user. The optical system provides optical aperture expansion for the purpose of a head-up display, and most preferably a near-eye display, which may be a virtual reality display, or more preferably an augmented reality display. The optical system preferably provides two-stage expansion of an input optical aperture, and where the first expansion is achieved using two distinct sets of mutually-parallel partially-reflecting surfaces ("facets"), each set handing a different part (non-identical but preferably overlapping) of an overall field-of-view (FOV) presented to the eye. In a first subset of embodiments (FIGS. 1A, 1B and 2-13), the optical system employs a single image projector ("POD") providing image illumination to two sets of facets that are integrated into the LOE. In a second subset of embodiments, two separate PODs deliver image illumination corresponding to two different parts (non-identical but preferably overlapping) of the FOV to their respective sets of facets. In the latter case, the first expansion may employ sets of facets that are part of corresponding expansion components that are external to the LOE (FIGS. 16A-16D and 19A-22C) or integrated as part of the LOE (FIGS. 1C, 1D, 14A-15B and 18). These various subsets of non-limiting embodiments will each be addressed individually below.

Referring now collectively to various embodiments which employ facets integrated with the LOE (e.g., FIGS. 1A-1D), these all show an optical system for directing image illumination injected into at least one coupling-in region to an eye-motion box for viewing by an eye of a user. In general terms, the optical system includes a light-guide optical element (LOE) 12 formed from transparent material, and including a first region 16 containing a first set of planar, mutually-parallel, partially-reflecting surfaces ("facets") having a first orientation and a second set of planar, mutually-parallel, partially-reflecting surfaces ("facets") having a second orientation non-parallel to the first orientation. (The facets are not visible in FIGS. 1A-1D, but will be illustrated schematically in drawings below.) The LOE also includes a second region 18 containing a third set of planar, mutually-parallel, partially-reflecting surfaces (or "facets," also referred to as "out-coupling surfaces"), having a third orientation non-parallel to each of the first orientation and the second orientation. The LOE is bounded by a set of mutually-parallel major external surfaces extending across the first and second regions such that the first, second and third sets of partially-reflecting surfaces are all located between the major external surfaces.

The third set of partially-reflecting surfaces are at an oblique angle to the major external surfaces so that a part of the image illumination propagating within the LOE by internal reflection at the major external surfaces from the first region into the second region is coupled out of the LOE towards the eye-motion box for viewing by the eye of the eye of the user. Each of the first and second sets of partially-reflecting surfaces is oriented so that a part of the image illumination propagating within the LOE by internal reflection at the major external surfaces from the at least one coupling-in region is deflected towards the second region.

Most preferably, each of the first and second sets of facets account for aperture expansion for a distinct part of the overall field of view. Specifically, the first set of partially-reflecting surfaces preferably deflects a first part of a field of view of the image towards the second region and the second set of partially-reflecting surfaces deflects a second part of the field of view of the image towards the second region, the first and second parts of the field of view combining to provide a continuous combined field of view larger than each of the first and second parts of the FOV. The two parts of the FOV preferably correspond roughly to two sides (left-right or top-bottom) of the total FOV, but with sufficient overlap of the central region to ensure full and continuous coverage of the center field across the eye-motion box, corresponding to the acceptable range of positions of the pupil of the observer for which the display is designed.

Exemplary implementations of the invention assume the form of a near-eye display, generally designated 10, employing LOE 12. The compact image projector (or "POD") 14 is optically coupled so as to inject an image into the LOE 12 (interchangeably referred to as a "waveguide," a "substrate" or a "slab"), within which the image light is trapped in one dimension by internal reflection at the planar major external surfaces. The light impinges on the first and second sets of partially-reflecting surfaces (interchangeably referred to as "facets"), where each set of facets is inclined obliquely to the direction of propagation of the image light, with each successive facet deflecting a proportion of the image light into a deflected direction, also trapped/guided by internal reflection within the substrate. These first and second sets of facets are not illustrated individually in FIGS. 1A-1D, but are located in a first region of the LOE designated 16. This partial reflection at successive facets achieves a first dimension of optical aperture expansion.

The first and second sets of partially-reflecting surfaces, located in region 16, deflect the image illumination from a first direction of propagation trapped by total internal reflection (TIR) within the substrate to a second direction of propagation, also trapped by TIR within the substrate. This partial reflection at successive facets achieves a first dimension of optical aperture expansion. In the cases of FIGS. 1C and 1D, two image projectors 14 are provided for each display, with the image illumination of each being expanded by a corresponding set of partially-reflecting surfaces in region 16.

The deflected image illumination then passes into second substrate region 18, which may be implemented as an adjacent distinct substrate or as a continuation of a single substrate, in which a coupling-out arrangement (either a further set of partially reflective facets or a diffractive optical element) progressively couples out a proportion of the image illumination towards the eye of an observer located within a region defined as the eye-motion box (EMB), thereby achieving a second dimension of optical aperture expansion. The overall device may be implemented separately for each eye, and is preferably supported relative to the head of a user with the each LOE 12 facing a corresponding eye of the user. In one particularly preferred option as illustrated here, a support arrangement is implemented as an eye glasses frame with sides 20 for supporting the device relative to ears of the user. Other forms of support arrangement may also be used, including but not limited to, head bands, visors or devices suspended from helmets.

Figure 1B:
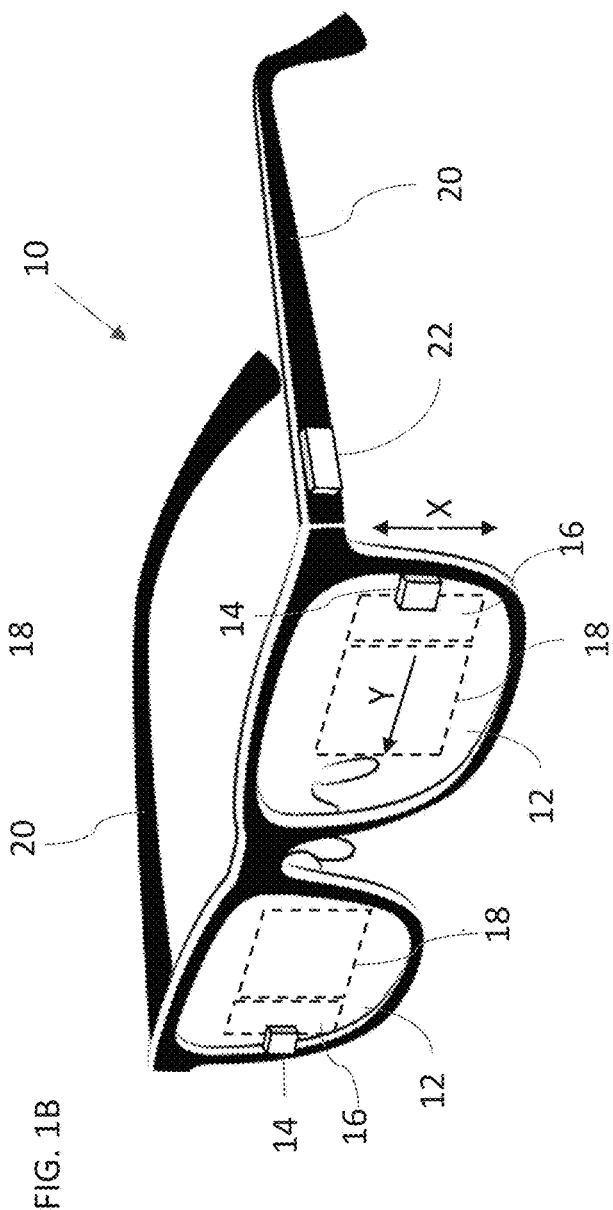
Figure 1C:
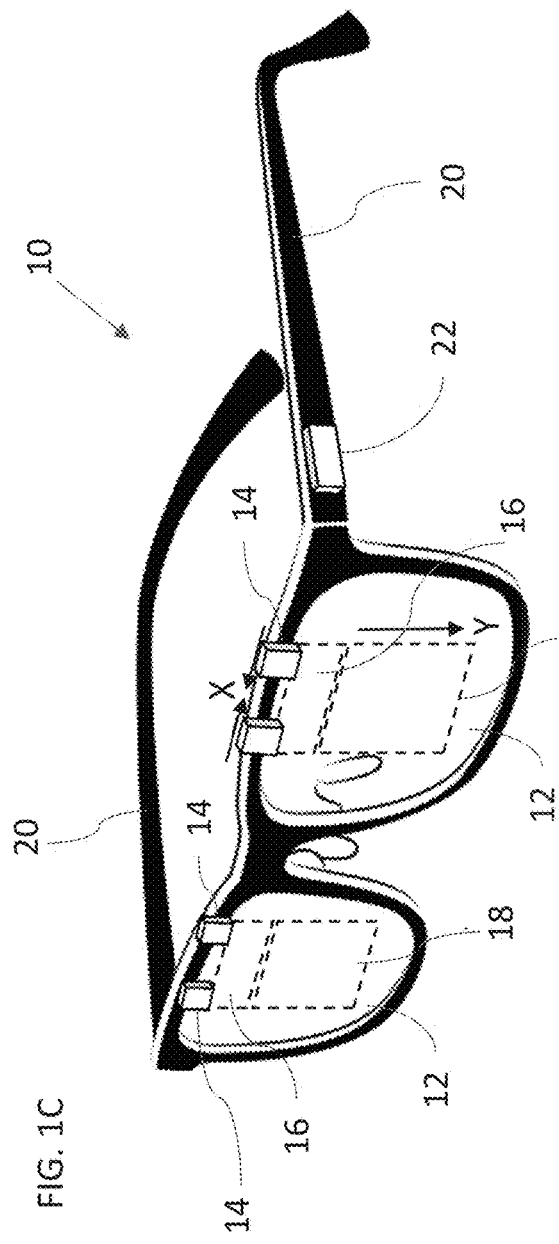
FIGS. 1C and 1D are schematic isometric views of an optical system implemented using a light-guide optical element (LOE), constructed and operative according to the teachings of a further aspect of the present invention employing two image projectors for each display, illustrating a top-down and a side-injection configuration, respectively.
Figure 1D:
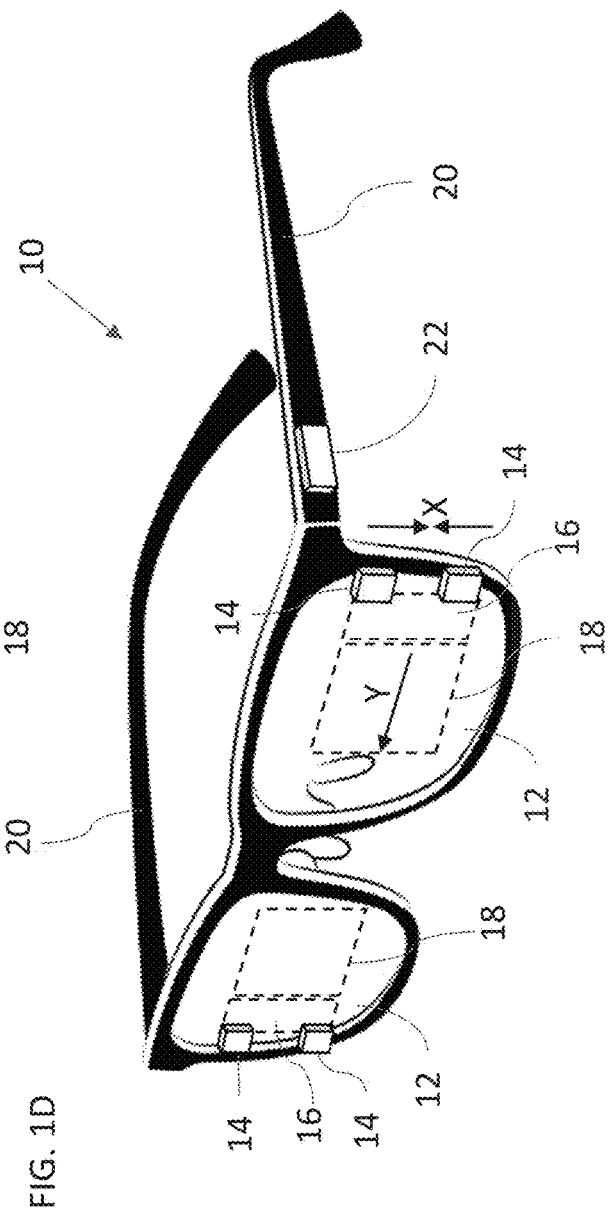

Reference is made herein in the drawings and claims to an X axis which extends horizontally (FIGS. 1A and 1C) or vertically (FIGS. 1B and 1D), in the general extensional direction of the first region of the LOE, and a Y axis which extends perpendicular thereto, i.e., vertically in FIGS. 1A and 1C and horizontally in FIGS. 1B and 1D.

In very approximate terms, the first LOE, or first region 16 of LOE 12, may be considered to achieve aperture expansion in the X direction while the second LOE, or second region 18 of LOE 12, achieves aperture expansion in the Y direction. The details of the spread of angular directions in which different parts of the field of view propagate will be addressed more precisely below. It should be noted that the orientation as illustrated in FIGS. 1A and 1C may be regarded as a "top-down" implementation, where the image illumination entering the main (second region) of the LOE enters from the top edge, whereas the orientation illustrated in FIGS. 1B and 1D may be regarded as a "side-injection" implementation, where the axis referred to here as the Y axis is deployed horizontally. In the remaining drawings, the various features of certain embodiments of the present invention will be illustrated in the context of a "top-down" orientation, similar to FIGS. 1A and 1C. However, it should be appreciated that all of those features are equally applicable to side-injection implementations, which also fall within the scope of the invention. In certain cases, other intermediate orientations are also applicable, and are included within the scope of the present invention except where explicitly excluded.

In a first set of preferred but non-limiting examples of the present invention, the aforementioned sets of facets are orthogonal to the major external surfaces of the substrate. In this case, both the injected image and its conjugate undergoing internal reflection as it propagates within region 16 are deflected and become conjugate images propagating in a deflected direction. In an alternative set of preferred but non-limiting examples, the first and second sets of partially-reflecting surfaces are obliquely angled relative to the major external surfaces of the LOE. In the latter case, either the injected image or its conjugate forms the desired deflected image propagating within the LOE, while the other reflection may be minimized, for example, by employing angularly-selective coatings on the facets which render them relatively transparent to the range of incident angles presented by the image whose reflection is not needed.

The POD employed with the devices of the present invention is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions.

Image projector 14 includes at least one light source, typically deployed to illuminate a spatial light modulator, such as an LCOS chip. The spatial light modulator modulates the projected intensity of each pixel of the image, thereby generating an image. Alternatively, the image projector may include a scanning arrangement, typically implemented using a fast-scanning mirror, which scans illumination from a laser light source across an image plane of the projector while the intensity of the beam is varied synchronously with the motion on a pixel-by-pixel basis, thereby projecting a desired intensity for each pixel. In both cases, collimating optics are provided to generate an output projected image which is collimated to infinity. Some or all of the above components are typically arranged on surfaces of one or more polarizing beam-splitter (PBS) cube or other prism arrangement, as is well known in the art.

Optical coupling of image projector 14 to LOE 12 may be achieved by any suitable optical coupling, such as for example via a coupling prism with an obliquely angled input surface, or via a reflective coupling arrangement, via a side edge and/or one of the major external surfaces of the LOE. Details of the coupling-in configuration are not critical to the invention, and are shown here schematically as a non-limiting example of a wedge prism 15 applied to one of the major external surfaces of the LOE.

It will be appreciated that the near-eye display 10 includes various additional components, typically including a controller 22 for actuating the image projector 14, typically employing electrical power from a small onboard battery (not shown) or some other suitable power source. It will be appreciated that controller 22 includes all necessary electronic components such as at least one processor or processing circuitry to drive the image projector, all as is known in the art.

Reference is made to co-assigned PCT patent application publication no. WO 2020/049542 A1 (hereafter "the '542 publication"), which was unpublished as of the priority date of this application and is not prior art, but which is hereby incorporated by reference in its entirety as if set out fully herein. All features of the present invention that are not otherwise specified should be understood to be as described in the '542 application.

A first aspect of the present invention differs from the configurations described in the '542 application primarily in that the first region of the LOE here 16 includes two distinct sets of partially-reflecting facets, typically at different (non-parallel) orientations, rather than just one as in the '542 publication, each of which independently directs a different part of the image field of view towards the second LOE region 18 for coupling out towards the eye-motion box. Such a configuration is implied in the two counter-directed arrows in FIGS. 1A-B, and is illustrated schematically in FIG. 2.

Figure 2:
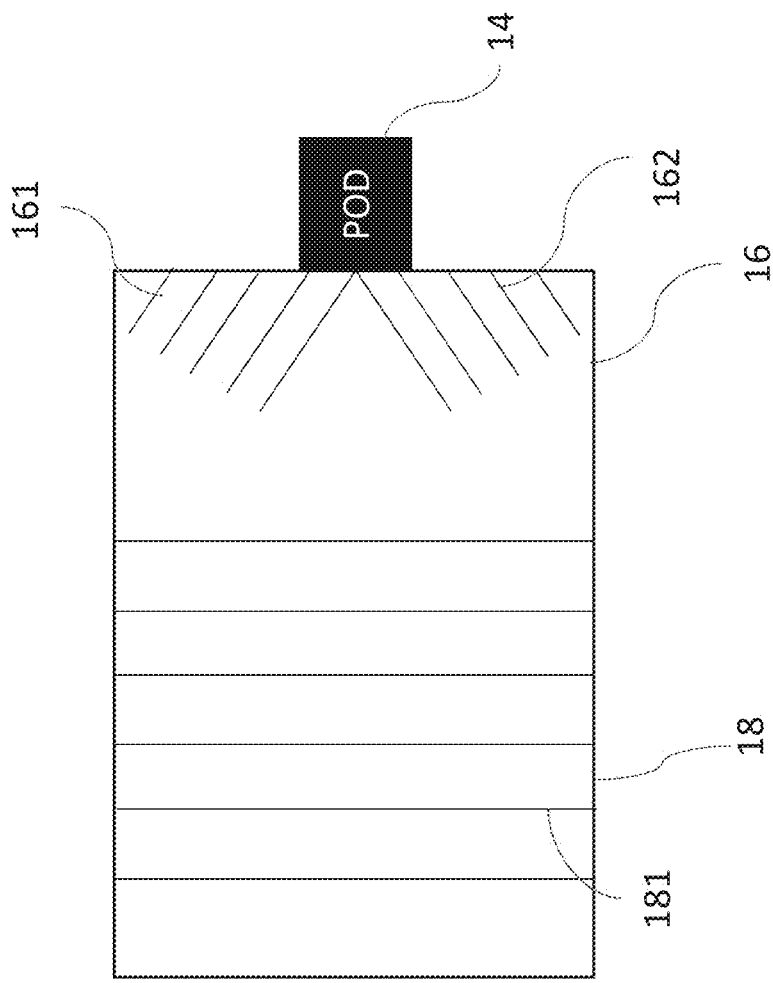
FIG. 2 is a schematic plan view of an LOE configuration for implementing the optical system of FIGS. 1A and 1B.

Specifically, in the non-limiting but preferred example of FIG. 2, a POD 14 injects an image into the first region of an LOE 16 near the middle (typically within the middle third) of a dimension of the LOE. The injected image is then partially reflected by two sets of partially reflecting surfaces 161 and 162 so as to expand the image in opposite directions along the X-axis and deflect it progressively from successive facets towards the second region of the LOE, where it is progressively coupled out toward the eye-motion box, either by a further set of inclined partially-reflecting facets or by a diffractive optical element, for viewing by an observer.

The first facet of each of the first two sets of partially-reflecting surfaces is preferably a deflection surface (alternatively referred to as a "coupling-in facet") which has a relatively high reflectivity, reflecting more than half of the image illumination that is incident on the facet, and typically at least 80%. The subsequent facets in each set preferably have lower reflectivity (except typically the last facet), and may have progressively increasing reflectively from facet to facet, such as 25%, 33%, 50% and 100%, thereby tending to compensate for the progressively diminishing illumination intensity reaching successive facets, thereby providing relatively uniform intensity output.

The use of two sets of facets that expand the optical aperture in opposite directions from a coupling-in region near the middle of a dimension of the LOE can, in certain embodiments, shorten the optical path length from the projector to the eye-motion box, and thereby reduce the overall required dimensions of the device to provide a given field of view to the observer compared to the configurations of the aforementioned '542 application.

According to one particularly preferred set of implementations of the present invention, the facets are implemented as "partial facets" such that the partially-reflecting properties are only present within a subregion of the cross-sectional area of the first region which includes the "imaging area" of each facet plane, and preferably excludes at least the majority of the "non-imaging area" for some or all of the facets. This is illustrated in the varying length of facets 161 and 162 in FIG. 2. The active (partially-reflecting) area of the facets preferably extends slightly beyond the minimum required to complete the geometrical requirements for the EMB image projection in order to avoid anomalies that may be caused by imperfections at the edges of coatings, and the facets may also be further extended in some cases due to additional considerations relating to integer numbers of overlaps between facets in the deflected image direction to achieve improved image uniformity.

Where the first region is formed from a stack of coated plates which are then cut at an appropriate angle (as described for example in PCT Patent Publication No. WO2007054928A1, and as known in the art), the selective spatial deployment of the partially-reflecting surfaces can advantageously be achieved by forming a stack of plates with a partially-reflecting coating located over a first part of the interface plane between two plates, while a second part of the interface plane is bonded (typically with index-matched adhesive and without coatings) so as to form an optical continuum between the two plates. Selective application of the partially-reflecting coatings is typically achieved by applying a suitable masking layer prior to the coating process, and removing the masking layer at the end of the coating process.

According to an alternative production technique, a stack of full area-coated plates may be formed and then cut to the shape required for the volume containing facets. The required form of the LOE is then completed by optically bonding this irregular block containing the partially-reflecting facets together with complementary blocks of plain index-matched glass.

The optical axis is not actually parallel to the X axis but rather lies in the X-Z plane, with a Z-component into the page chosen such that the entire range of angles in the depth dimension of the FOV undergo total internal reflection at the major substrate surfaces. The optical axis may also be offset from the X axis in the Y direction to optimize the LOE design, such as is described in detail in the '542 application. For simplicity of presentation, the graphic representations herein, and the description thereof, will relate only to the in-plane (X-Y) component of the light ray propagation directions, referred to herein as the "in-plane component" or the "component parallel to the major external surfaces of the LOE."

It will be noted that some reflections of the left side of the field of view are reflected from facets near the right side of the LOE in a direction that will not reach the EMB, and will therefore be lost. Similarly, some rays from the right side of the field of view are reflected from facets near the left of the LOE and are deflected in a direction which will not reach the EMB, and will therefore be lost. Certain aspects of the present invention take advantage of these observations to reduce the dimensions (and hence volume and weight) of the first LOE (or LOE region).

Figure 3:
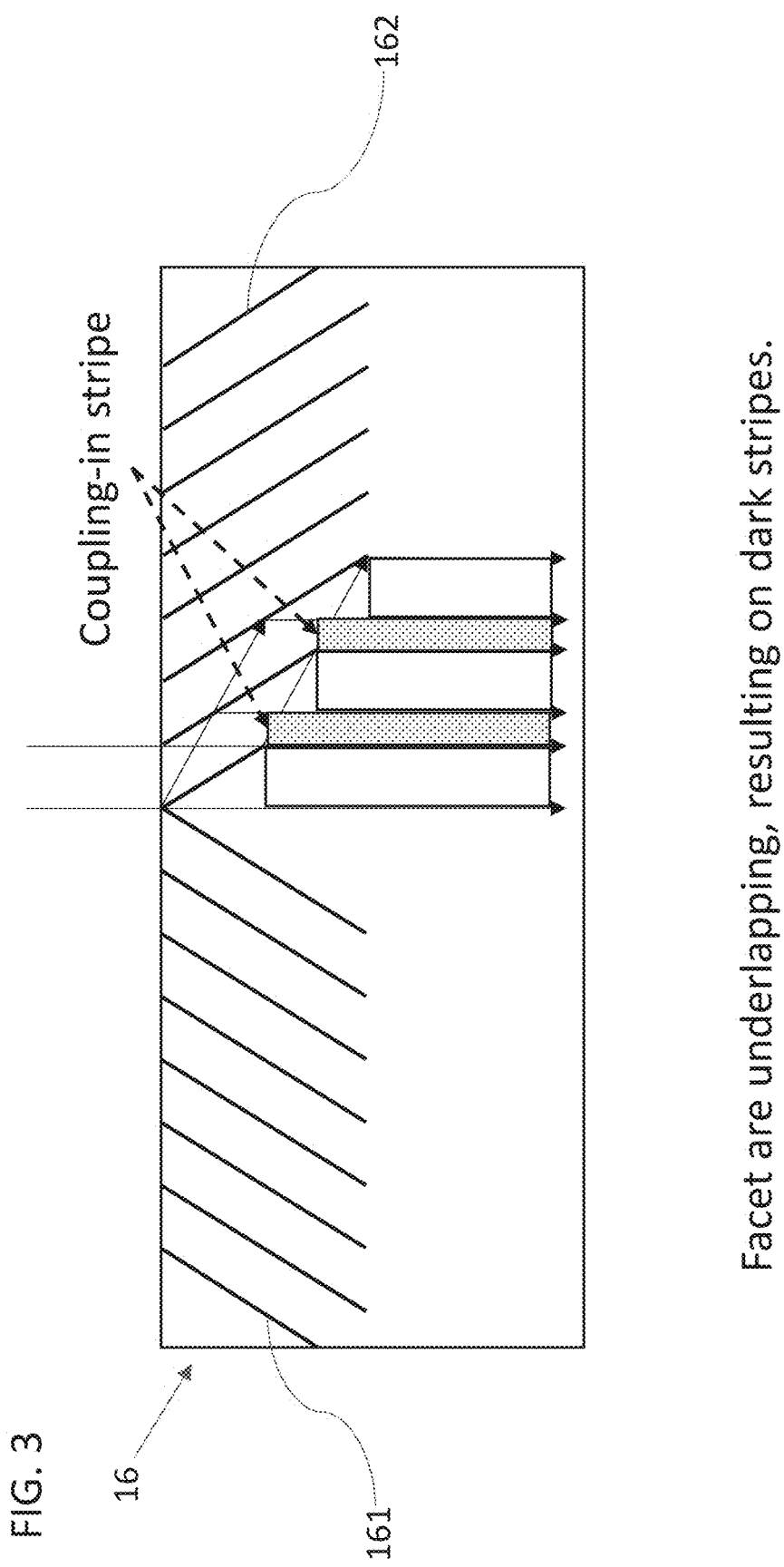
FIGS. 3-7 are schematic enlarged views of a first region of the LOE of FIG. 2 illustrating various geometrical considerations for determining a desired spacing and deployment of partially-reflecting surfaces in the first region of the LOE.

The distances between adjacent facets in 161 and 162 depends on the FOV and on the size of the entrance aperture of the coupling-in region, and must be designed so as to properly replicate the entrance aperture to the entire EMB, uniformly and without any empty region regions. For a given entrance aperture size, a constant spacing between facets 161 or 162, will result in non-uniform illumination, and to the appearance of bright or dark 'stripes', as illustrated in FIG. 3. To avoid this, the distance between adjacent facets should be set so as to minimize the appearance of such stripes, using geometric considerations, as will now be discussed in detail.

Figure 4:
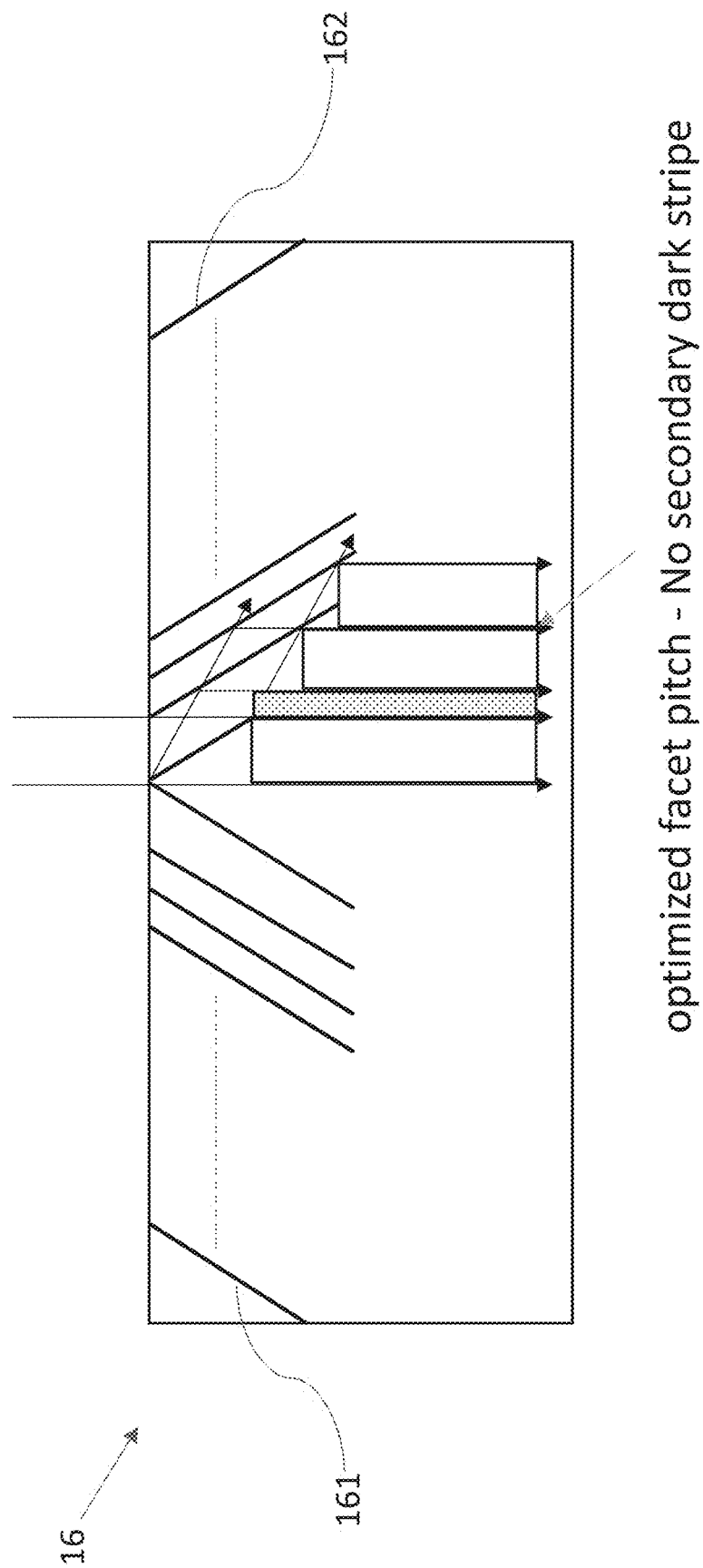
Figure 5:
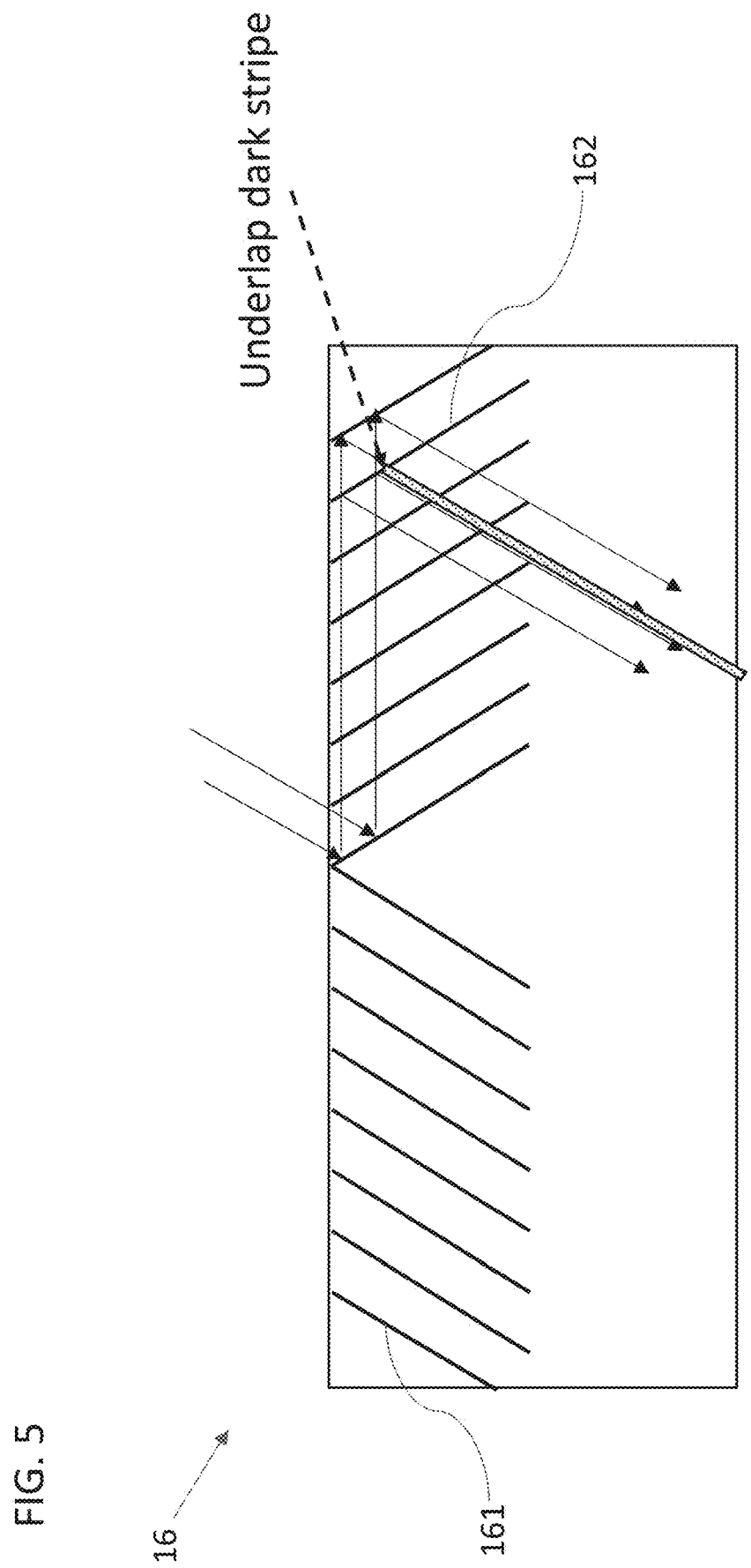
Figure 6:
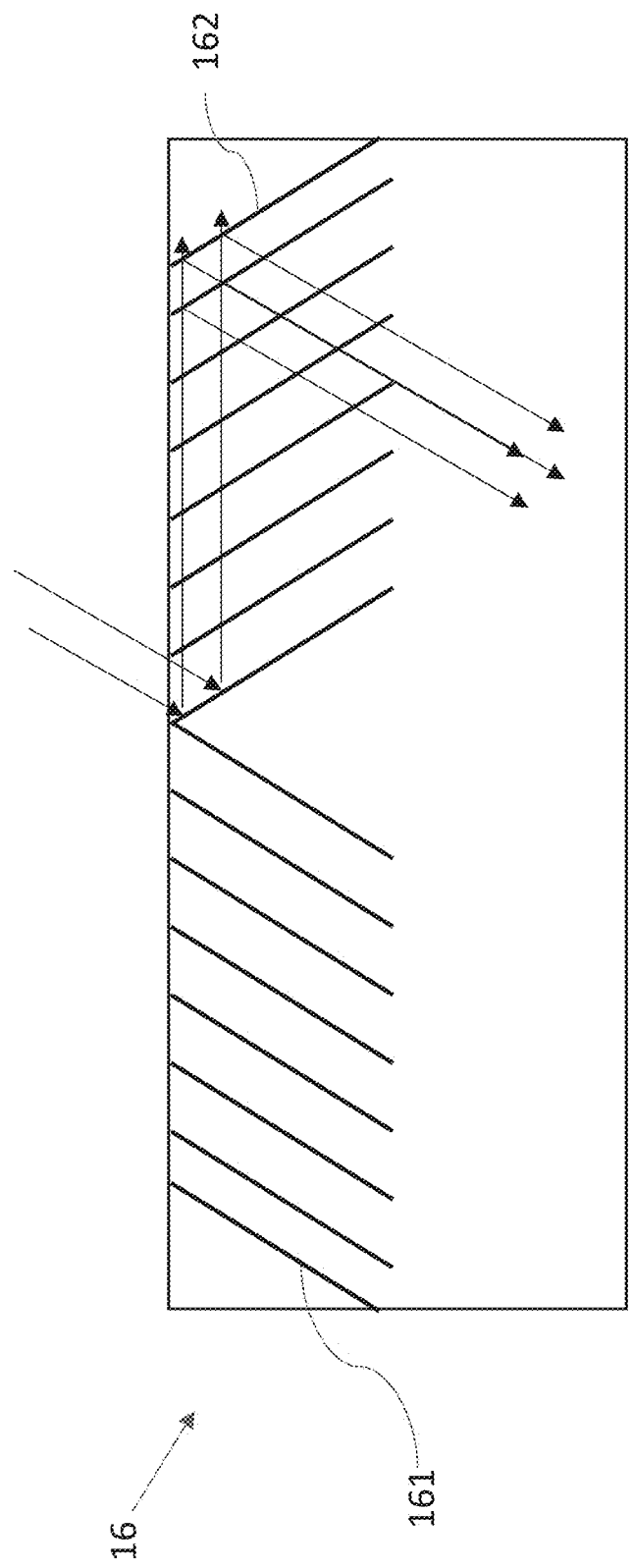
Figure 7:
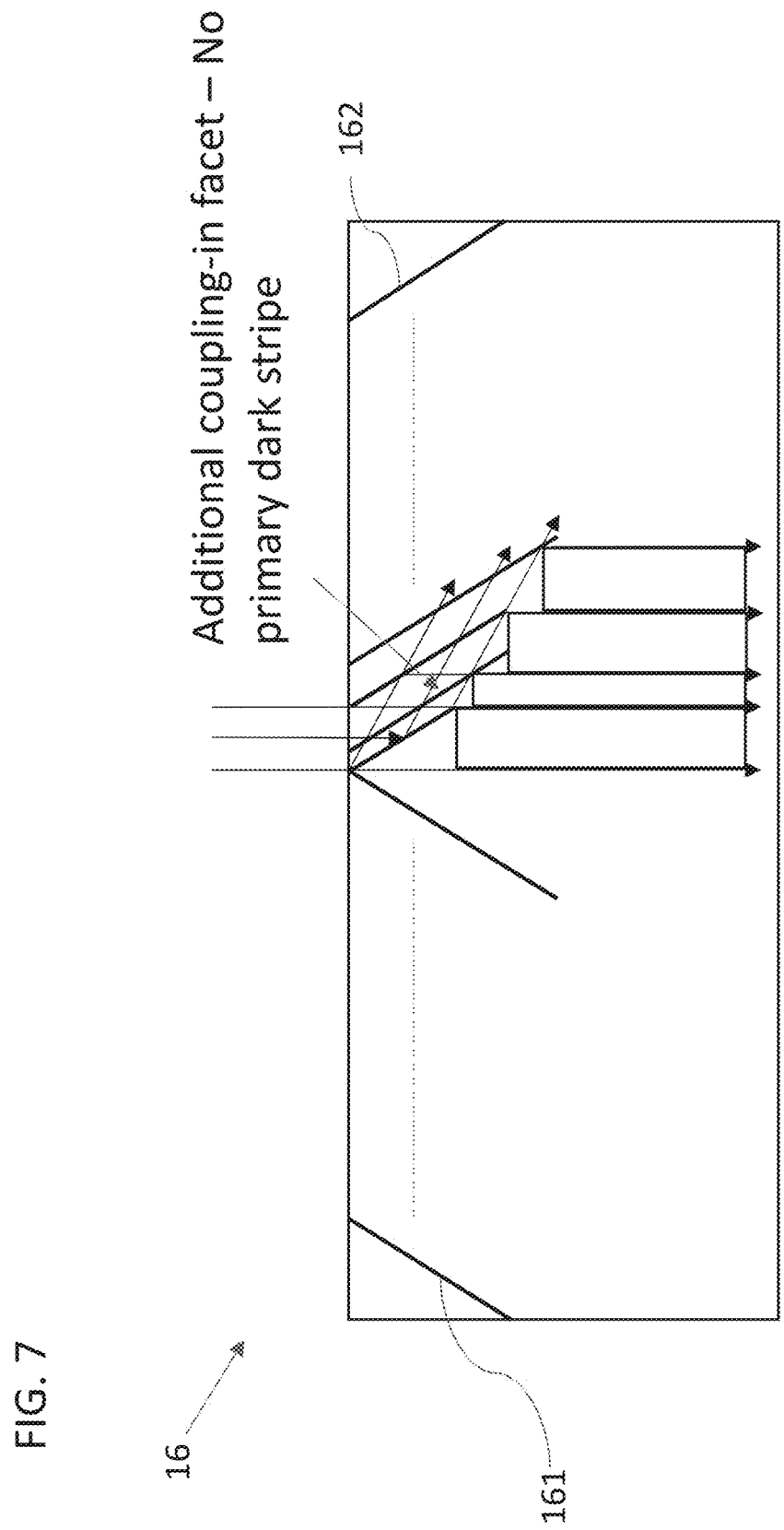

As illustrated in FIG. 4, the distances between adjacent facets should be chosen so as to replicate the entrance aperture without any holes and without any overlap. Since each facet reflects a certain subset of the complete FOV, this distance should be optimized for the relevant subset of the FOV, and the distance is expected to vary between adjacent facets, as described in FIGS. 5-6. However, varying the distance between adjacent facets can only minimize the effect of bright or dark stripes starting outside the coupling-in region. The first dark 'stripe' can be minimized by adding an additional facet between the first two facets, which will redirect light to the dark region, as illustrated schematically in FIG. 7.

Another embodiment of this invention which helps improve uniformity of the illuminated output image in the entire EMB is presented in FIG. 8, which includes many closely spaced facets. By reducing the facet spacing by an integer number as compared to that described above, any non-uniformity of the image is better averaged, and thereby mitigated. Furthermore, as it is extremely difficult to design an achromatic highly reflective coating for a large FOV and with constant uniform reflectivity, it is advantageous to divide the reflectivity of the first facet onto several facets, as described by the gray facets of FIG. 8.

Light needs to be coupled from the POD into the waveguide. One way to achieve this, is by placing a wedge which matches between the optical axis of the illumination system of the POD and the plane of the waveguide, as presented in FIG. 9.

Figure 10B:
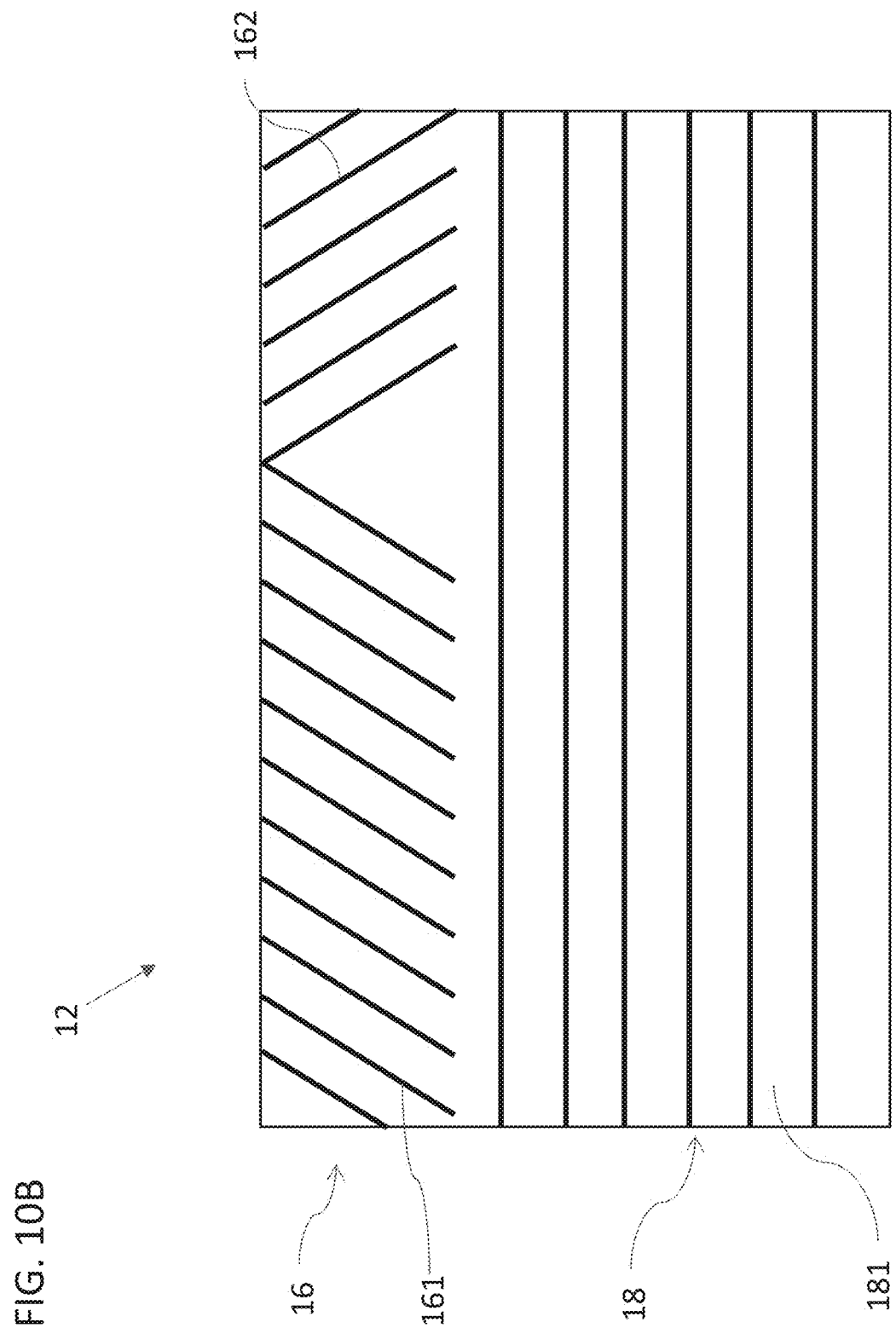

So far, we discussed and presented configurations which were symmetric, such as those presented in FIG. 10A. However, the two section of facets 161 and 162 do not need to be symmetric, and the FOV that is treated by each set of facets could be different. For instance, it often preferred to place the POD in a location that is not centered, in relation to the EMB, and as illustrated in FIG. 10B. Also, the angular orientation of the facets in the two regions could be different, as in FIG. 10C, either because the size of the FOV illuminated by each section is different (in which case, the size of the two regions mostly often will not be the same), or if the azimuthal orientation of the facets in region 18 is not parallel\perpendicular to the major axis of the FOV.

Figure 11:
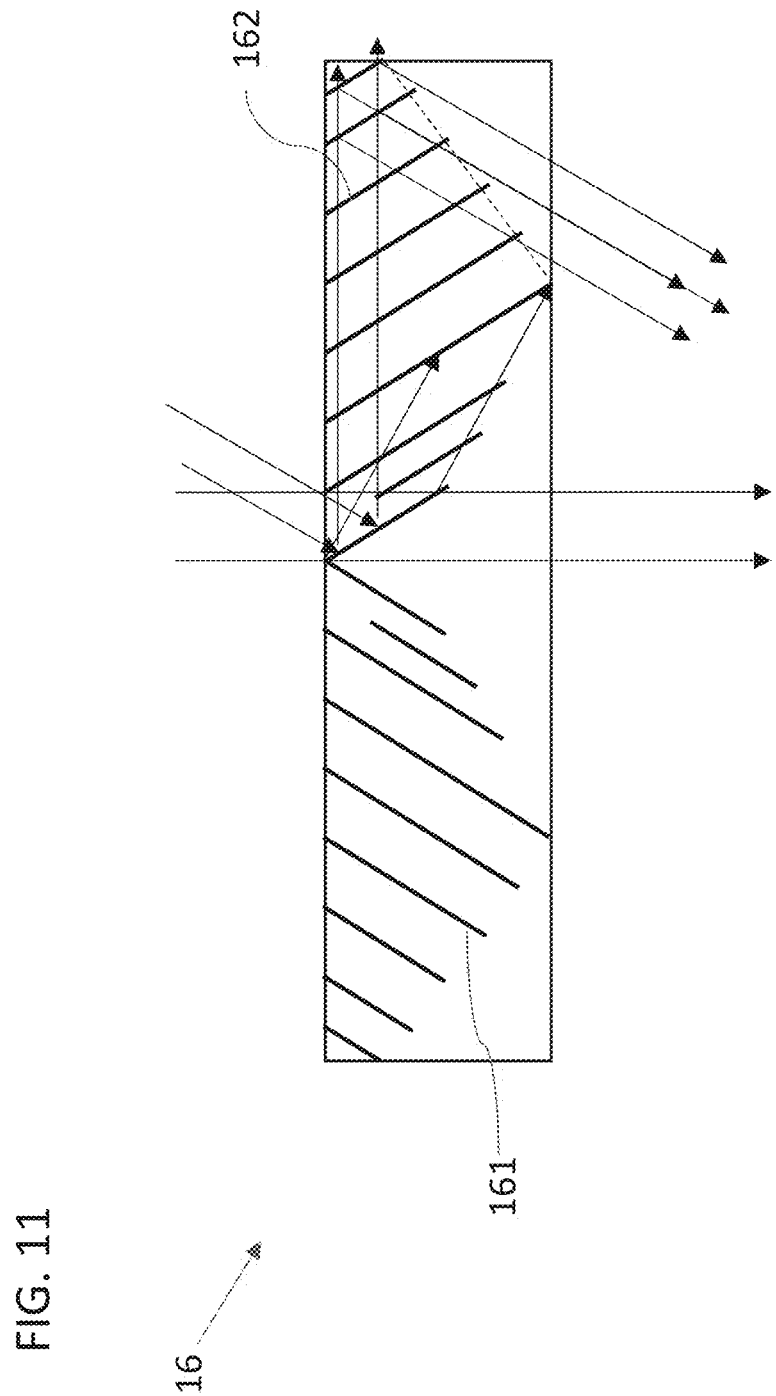
FIG. 11 illustrates a particularly preferred implementation of the first region of the LOE of FIG. 2 combining the geometrical considerations presented in FIGS. 3-7 and employing variable length facets.

In order to minimize ghosts and enhance efficiency, it is advantageous use "partial facets", as explained above. An implementation of this concept to the current application is schematically illustrated in FIG. 11.

Figure 12B:
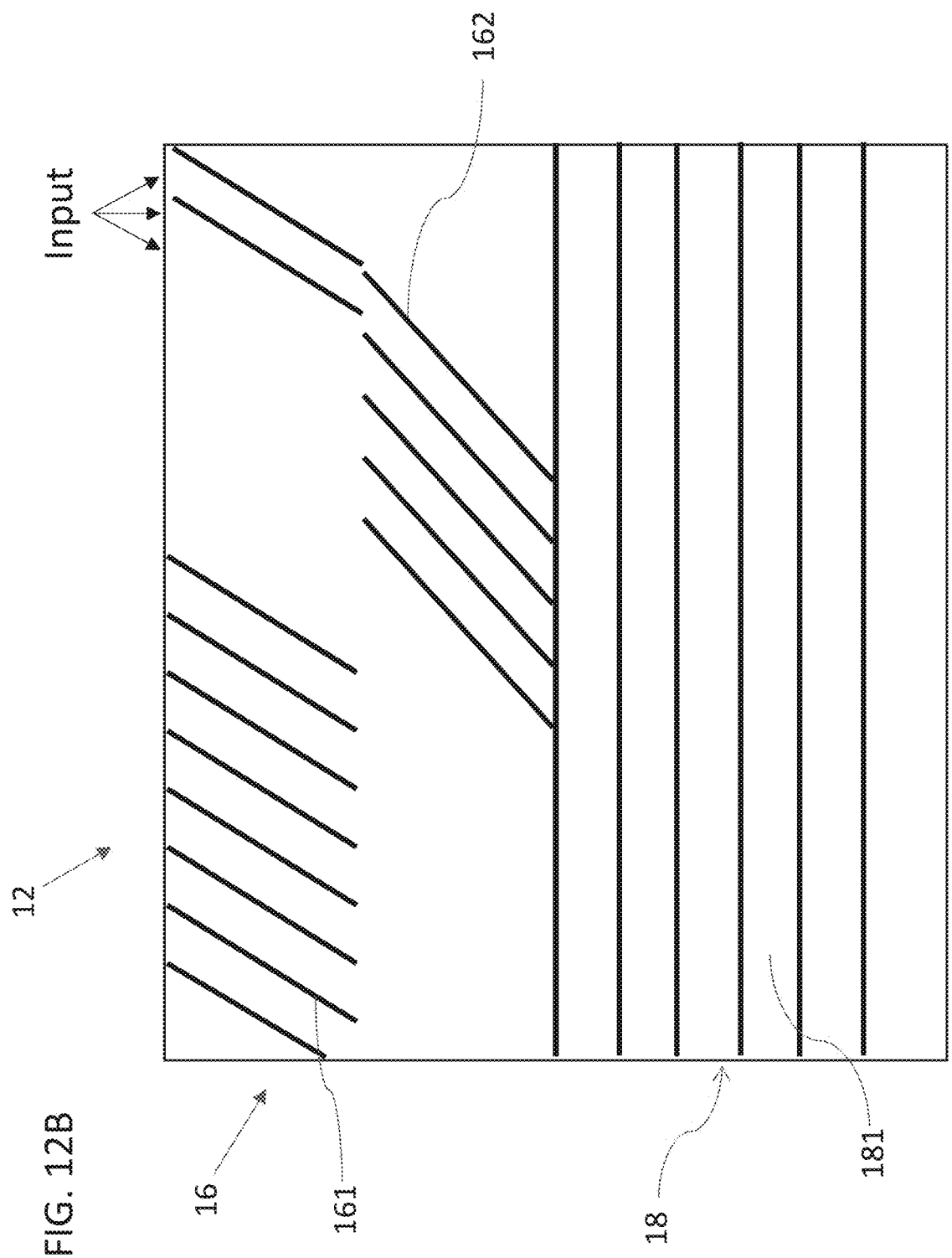

Another embodiment of this invention is presented in FIGS. 12A-C, where two subsections of facets 161 and 162 are placed one after the other, rather than one next to the other in a side-by-side configuration as in all figures so far. In such an embodiment, the orientation of the facets in region 161 and 162 could be approximately opposite to one another, such that light will propagate to opposite orientations (in the figure, right and left) as in FIG. 12A, or in approximately parallel orientation, such that light in both sections propagates in the same general direction as in FIGS. 12B-C. In the latter configuration, the location of the coupling-in region would be placed around the edge of region 16, thereby simplifying the structure of the coupling-in, and minimizing the effects of non-uniformity at the central FOV (chief ray). The angular orientation of the facets in 12A-B does not need to be identical, as illustrated in FIG. 12C. (The option of changing facet angle in the arrangement of FIG. 12A is also possible, although not explicitly illustrated.).

Figure 13:
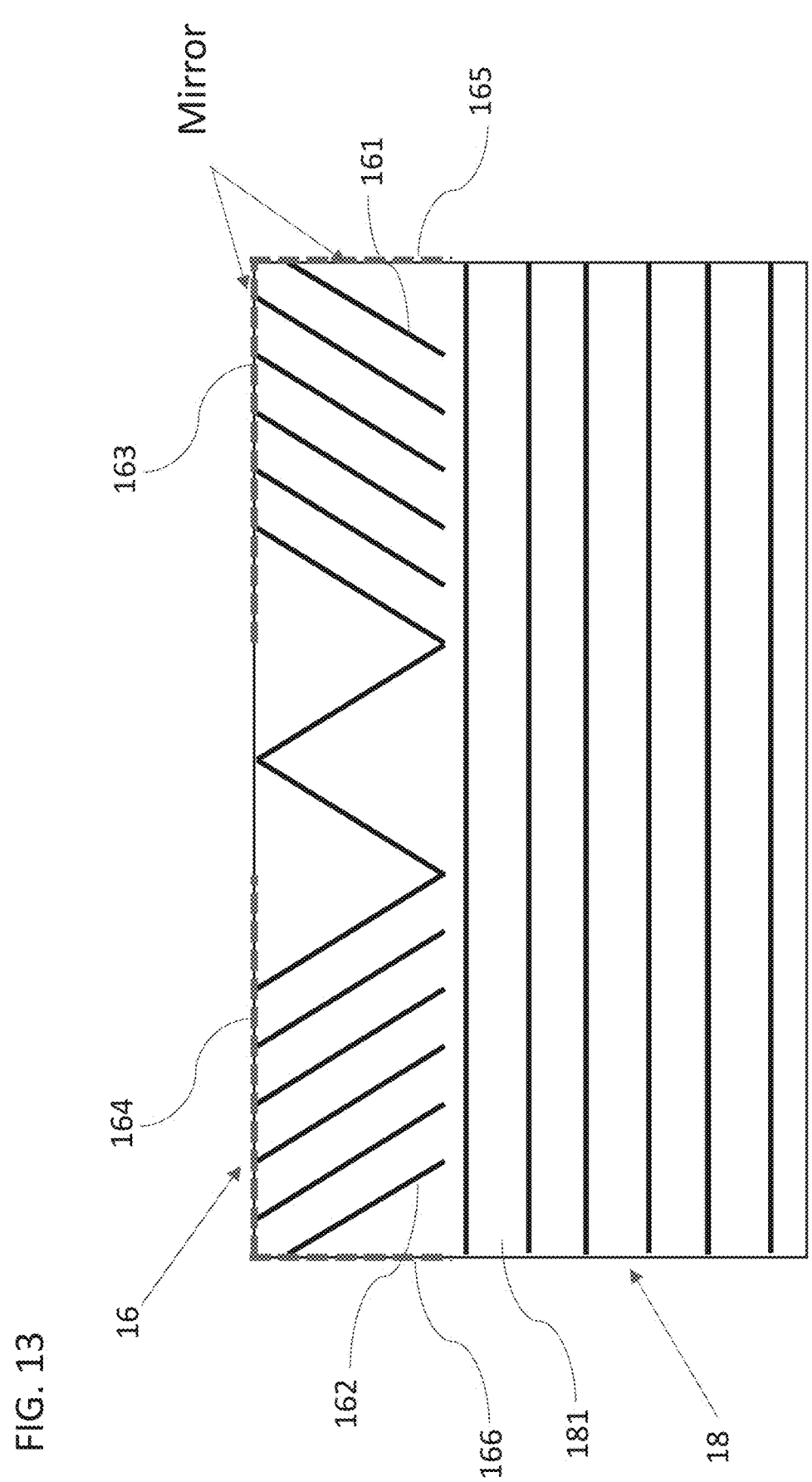
FIG. 13 is a schematic representations of further variant implementations of the LOE of FIG. 2 employing peripheral mirror surfaces.

FIG. 13 presents a configuration in which the surfaces of the waveguide at region 16 are coated with high reflective coating, e.g., silver coating, and the facets 161 (162) are oriented such that light impinging on the them can either be reflected to 163 (164), and then reflected back into 18, or they can be transmitted through 161 (162), be reflected off the edge 165 (166), and reflected by 161 and redirected into 18. The angular orientations of 163-166 must be extremely accurate, otherwise there will be substantial ghost images.

Here and elsewhere in this document, it will be noted that the terms "trimmed" and "truncated" are used to refer to geometries or dimensions of a final product that are reduced relative to the theoretical starting point of the implementation, and typically result in situations where different facets have different lengths as measure parallel to the major external surfaces of the LOE. This terminology does not carry any implementation of physically cutting away material or any other particular production technique. It is not necessarily envisaged that the LOE would be truncated exactly along the border of the indicated regions, but rather that these regions provide design flexibility, allowing the LOE to be finished with whatever arbitrary outer contour is considered esthetically preferred and/or mechanically compatible with additional details of a desired application.

It will be noted that the use of partial facets as described above may provide one or more of a number of advantages, including improved efficiency and brightness where transmission of the image from the facets further from the coupling-in region does not need to pass through so many additional facets before reaching the second LOE region. Additionally, in some cases, omission of facets in regions that are not required for image projection can avoid unwanted "ghost" reflections that might otherwise reduce image quality.

Turning now to FIGS. 1C, 1D and 14A-22C, a further set of embodiments of the present invention employ two distinct image projectors to provide distinct parts of an overall field of view of an image displayed to the eye of a user. Thus, in general terms, according to this aspect of the present invention, an optical system 10 for delivering an image to an eye-motion box for viewing by an eye of a user includes a light-guide optical element (LOE) 12 formed from transparent material in which are provided an out-coupling set of planar, mutually-parallel, partially-reflecting surfaces located between a set of mutually-parallel major external surfaces. A first image projector POD 1 is configured to project image illumination corresponding to a first part of a collimated image from an optical aperture, the image illumination following a first light path from the optical aperture into the LOE so as to propagate within the LOE by internal reflection at the major external surfaces and to be progressively coupled-out from the LOE by the out-coupling set of partially-reflecting surfaces towards the eye-motion box. A second image projector POD 2 is configured to project image illumination corresponding to a second part of a collimated image from an optical aperture, the image illumination following a second light path from the optical aperture into the LOE so as to propagate within the LOE by internal reflection at the major external surfaces and to be progressively coupled-out from the LOE by the out-coupling set of partially-reflecting surfaces towards the eye-motion box. Alternatively, the out-coupling set of facets may be replaced by a diffractive optical element for progressively coupling-out the image illumination towards the EMB, as is known in the art. The first and second parts of the collimated image combine at the eye-motion box to provide a combined image.

It is a particularly preferred feature of this aspect of the present invention that the optical system further includes a first optical expansion component including a first set of planar, mutually-parallel, partially-reflecting surfaces having a first orientation, and deployed in the first light path so as to expand the optical aperture of the first image projector and to direct the image light towards the out-coupling set of partially-reflecting surfaces. Similarly, the optical system includes a second optical expansion component including a second set of planar, mutually-parallel, partially-reflecting surfaces having a second orientation, and deployed in the second light path so as to expand the optical aperture of the second image projector and to direct the image light towards the out-coupling set of partially-reflecting surfaces.

Figure 14A:
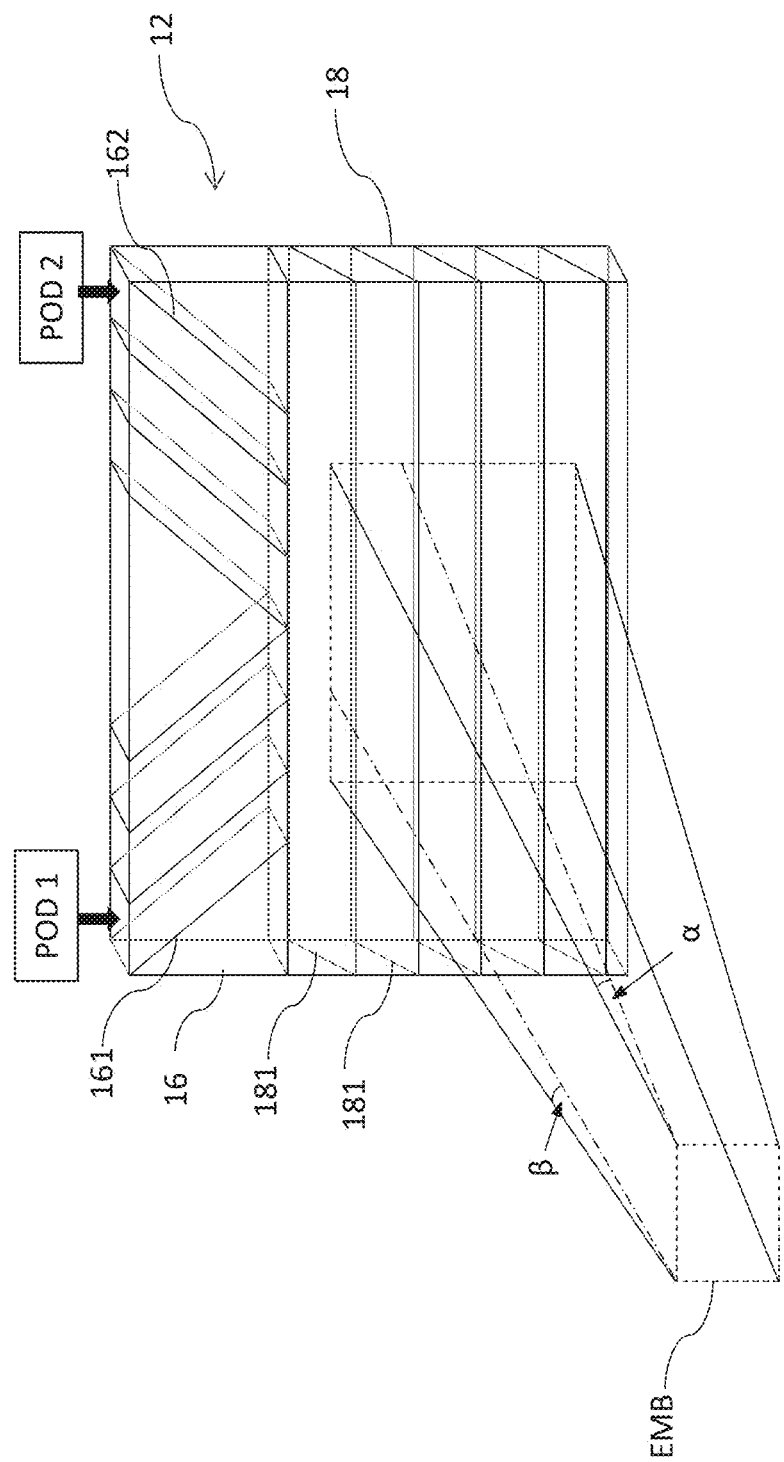
FIG. 14A is a schematic isometric view of an LOE configuration for implementing the optical system of FIGS. 1C and 1D.
Figure 14B:
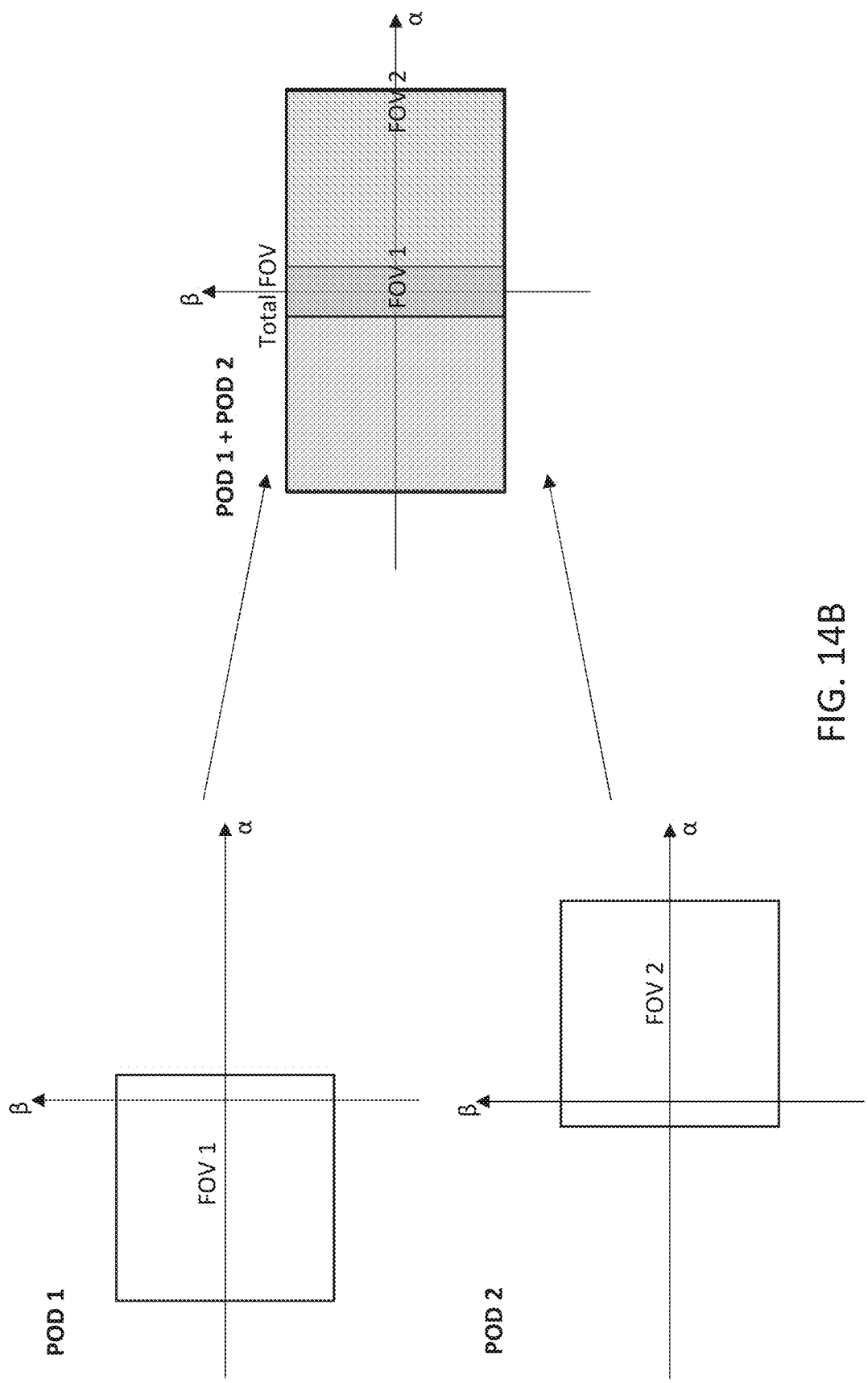
FIG. 14B is a schematic representation of a subdivision of an overall field-of-view between two image projectors from the optical system of FIG. 14A.

FIG. 14B illustrates how the FOV is divided between the two PODs in one non-limiting implementation of the invention. Each POD illuminates part of the FOV, and together they compose the entire FOV that is projected onto the observer's retina. Here each of the two PODs is responsible for a FOV of equal size, but alternatively, one of the PODs could provide a larger part of the FOV than the other. To reduce boundary artifacts, it is typically preferable to include a region of overlap in FOV between the two PODs, as illustrated.

Figure 15A:
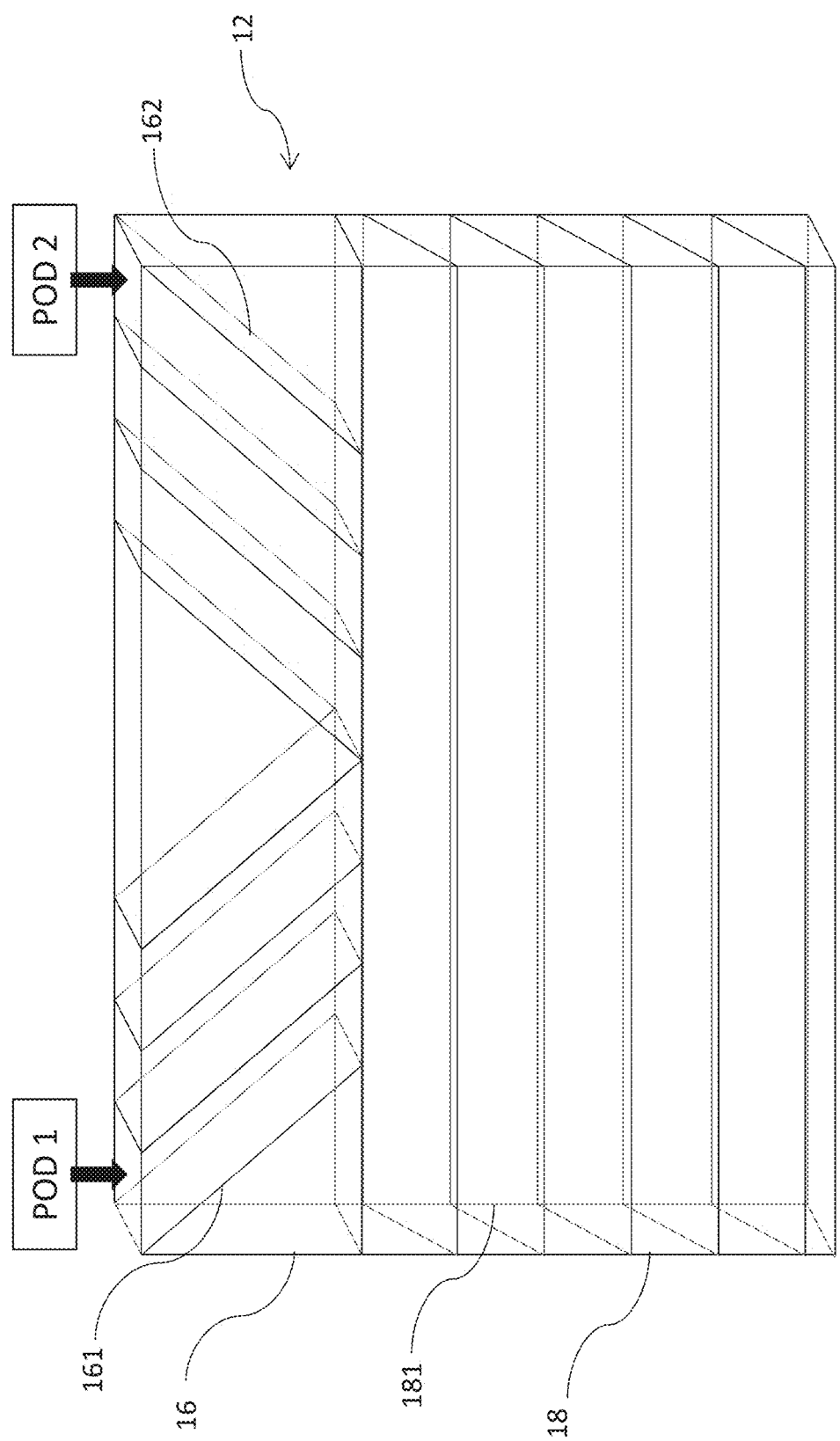
FIGS. 15A and 15B are enlarged schematic isometric views of the LOE from the optical system of FIG. 14A illustrating implementations employing orthogonal and obliquely-angled partially-reflecting surfaces, respectively, for a first optical aperture expansion.
Figure 15B:
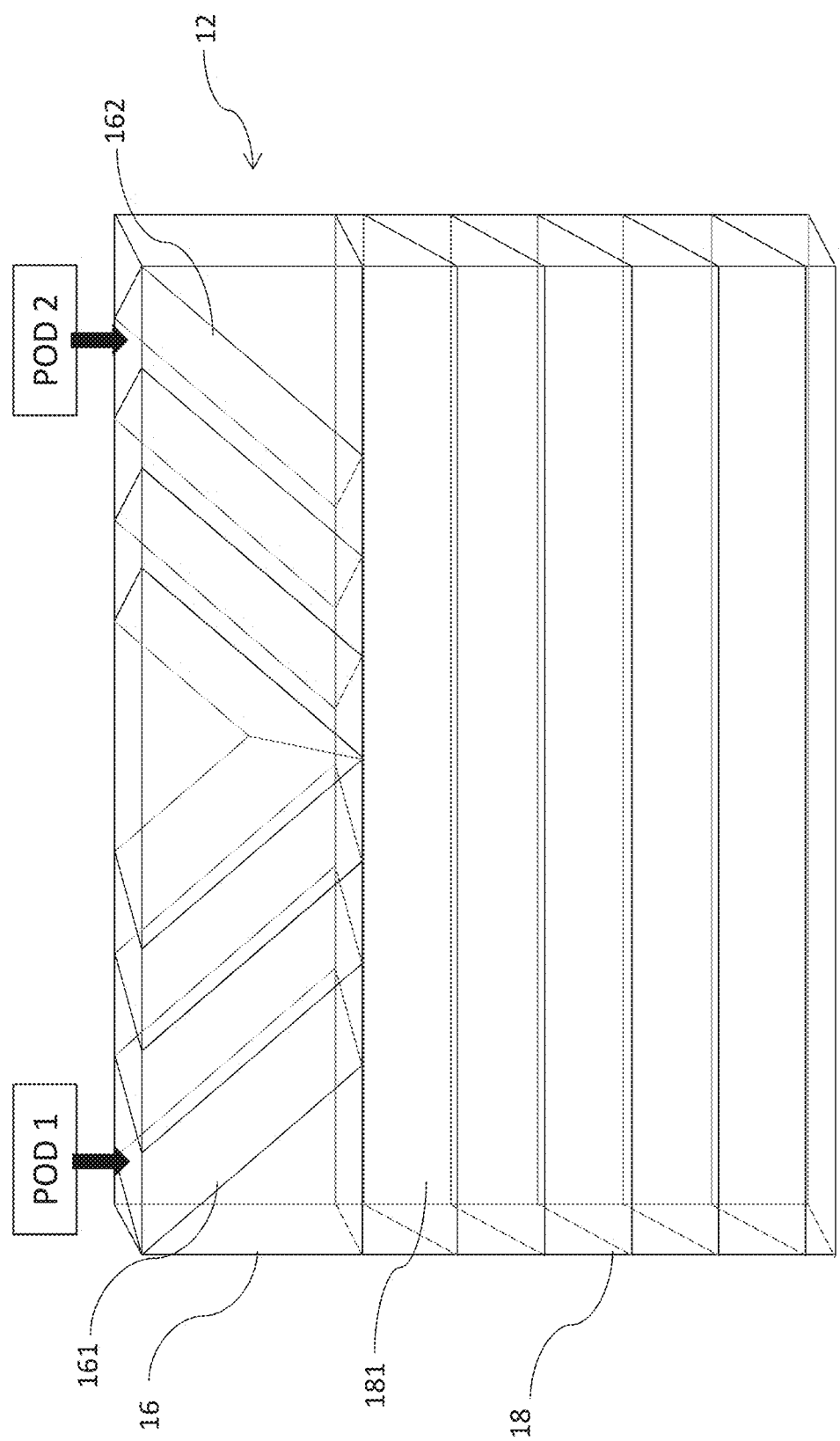

According to a first subset of these implementations, as illustrated in FIGS. 14A-15B and 18, the first and second sets of partially-reflecting surfaces 161 and 162 are located within the LOE 12 between the major external surfaces of the LOE. As in the earlier embodiments, this implementation may employ first and second sets of partially-reflecting surfaces 161 and 162 which are perpendicular to the major external surfaces of the LOE, as illustrated in FIGS. 14A and 15A. In this case, both the injected image and its conjugate undergoing internal reflection as it propagates within region 16 are deflected and become conjugate images propagating in a deflected direction. Alternatively, first and second sets of partially-reflecting surfaces 161 and 162 that are obliquely angled to the major external surfaces of the LOE may be used, as illustrated in FIG. 15B. In the latter case, either the injected image or its conjugate forms the desired deflected image propagating within the LOE, while the other reflection may be minimized, for example, by employing angularly-selective coatings on the facets which render them relatively transparent to the range of incident angles presented by the image whose reflection is not needed. In these implementations, the structure and design considerations for each part (e.g., half) of the first portion 16 of LOE 12 are generally similar to the structures described in the aforementioned '542 publication.

Optionally, one or both of the PODs may be provided with two sets of partially-reflecting facets at different orientations, such that one or both parts of the first portion 16 of LOE 12 may be implemented according to the teachings of FIGS. 2-13 described above. An example of such an implementation is illustrated schematically in FIG. 18, where the first image projector POD 1 injects image illumination via a first optical expansion component which includes both the first set of partially-reflecting surfaces 161 and a third set of mutually-parallel partially-reflecting surfaces 163, non-parallel to surfaces 161. First and third sets of facets 161 and 163 expand the optical aperture of the first image projector POD 1 in opposite directions along the X-axis, in a manner similar to that described above, and direct the image illumination towards the out-coupling set of partially-reflecting surfaces 181 in second portion 18 of the LOE 12.

Preferably, the second image projector POD 2 also injects image illumination via a second optical expansion component which includes both the second set of partially-reflecting surfaces 162 and a fourth set of mutually-parallel partially-reflecting surfaces 164, non-parallel to surfaces 162. Second and fourth sets of facets 162 and 164 expand the optical aperture of the second image projector POD 2 in opposite directions along the X-axis, in a manner similar to that described above, and direct the image illumination towards the out-coupling set of partially-reflecting surfaces 181 in second portion 18 of the LOE 12. The two parts of the image illumination provided by the first and second image projectors combine, preferably with slight overlap, at the EMB to provide the user with a full combined FOV, as described above with reference to FIG. 14B.

Where double sets of facets are used for aperture expansion for a single image projector, the arrangement may be symmetrical or asymmetric with respect to positioning of the input aperture, inclination of the facets, and any other design consideration, and the length of the facets and their reflectivity may vary along the sequence of facets, all as discussed above in the context of the single image projector implementations.

An alternative set of implementations of this aspect of the present invention employ first and second optical expansion components that are external to, and optically coupled to, the LOE. Examples of such implementations will now be described with reference to FIGS. 16A-16D and 19A-22C. In these non-limiting but preferred examples, injection of the image illumination from the first and second image projectors 210, 220 into the LOE 403 occurs through the first and second optical expansion components 203L and 203R, respectively.

As seen in FIGS. 16A-16D, the first and second optical expansion components 203L and 203R may each advantageously be implemented in a slab having two major surfaces, wherein one of the major surfaces is optically coupled to a coupling-in surface associated with the LOE 403. In the case shown here, the two components are integrated into a single slab 203, thereby facilitating manufacture and assembly of the components. Optical coupling from the slab 203 to LOE 403 may be achieved via a wedge prism 800 or other suitably formed coupling prism, providing a coupling-in surface that is obliquely angled relative to the major external surfaces of the LOE 403. The oblique angle of the coupling-in surface is chosen to allow direct coupling-in of image illumination at a range of angles that will propagate with LOE 403 via internal reflection at the major external surfaces. Direct optical coupling of the slab 203 to an inclined edge of LOE 403 is also possible, as exemplified in FIG. 19A, below.

Although the illustrations of FIGS. 16A-16D show first and second optical expansion components 203L and 203R as parts of a planar slab 203 attached to a common planar coupling-in surface, in certain particularly preferred but non-limiting examples, separate coupling-in surfaces at different angles may be used. In such a case, as exemplified in FIG. 19C, the slab of the first optical expansion component 203L is optically coupled to a first coupling-in surface 802L associated with LOE 403, and the slab of the second optical expansion component 203R is optically coupled to a second coupling-in surface 802R associated with LOE 403, where the first and second coupling-in surfaces 802L and 802R are non-coplanar. The use of non-coplanar coupling-in surfaces may ease certain design considerations, particularly when trying to achieve a wide field of view.

As an alternative to the aforementioned edge coupling, certain other implementations of this aspect of the present invention employ coupling-in of image illumination from the first and second optical expansion components 203L and 203R to LOE 403 via a coupling-in surface is coplanar with, or parallel to, one of the major external surfaces of LOE 403. In this case, LOE 403 preferably includes at least one at least partially reflecting coupling-in surface. Implementations according to this approach are discussed herein with reference to FIGS. 20A-22C.

As with the integrated implementations, the first and/or second optical expansion components 203L and 203R may here too be implemented using two distinct sets of partially-reflecting surfaces for optical aperture expansion for each image projector, as exemplified in the examples of FIGS. 19A-22C. An example of such an implementation is illustrated schematically in FIG. 19A, where the first image projector POD 1 injects image illumination via first optical expansion component 203L which includes both a first set of partially-reflecting surfaces 205 and a third set of mutually-parallel partially-reflecting surfaces 207, non-parallel to surfaces 205. First and third sets of facets 205 and 207 expand the optical aperture of the first image projector POD 1 in opposite directions along the X-axis, and direct the image illumination towards the coupling-in interface with waveguide 403, so as to propagate by internal reflection within LOE 403 until coupled out towards the EMB by out-coupling facets 404.

Preferably, the second image projector POD 2 also injects image illumination via a second optical expansion component 203R which includes both a second set of partially-reflecting surfaces 206 and a fourth set of mutually-parallel partially-reflecting surfaces 208, non-parallel to surfaces 206. Second and fourth sets of facets 206 and 208 expand the optical aperture of the second image projector POD 2 in opposite directions along the X-axis, and direct the image illumination towards the coupling-in interface with waveguide 403, so as to propagate by internal reflection within LOE 403 until coupled out towards the EMB by out-coupling facets 404. The two parts of the image illumination provided by the first and second image projectors combine, preferably with slight overlap, at the EMB to provide the user with a full combined FOV, as described above with reference to FIG. 14B.

Where double sets of facets are used for aperture expansion for a single image projector, the arrangement may be symmetrical or asymmetric with respect to positioning of the input aperture, inclination of the facets, and any other design consideration, and the length of the facets and their reflectivity may vary along the sequence of facets, all as discussed above in the context of the single image projector implementations. An example of asymmetric facet inclination relative to the central optical axis of the first, and in this case also second, image projector is illustrated in FIGS. 21A and 21B. This allows optimization of the facet angles for the corresponding part of the field of view relevant for illuminating the EMB.

Figure 17:
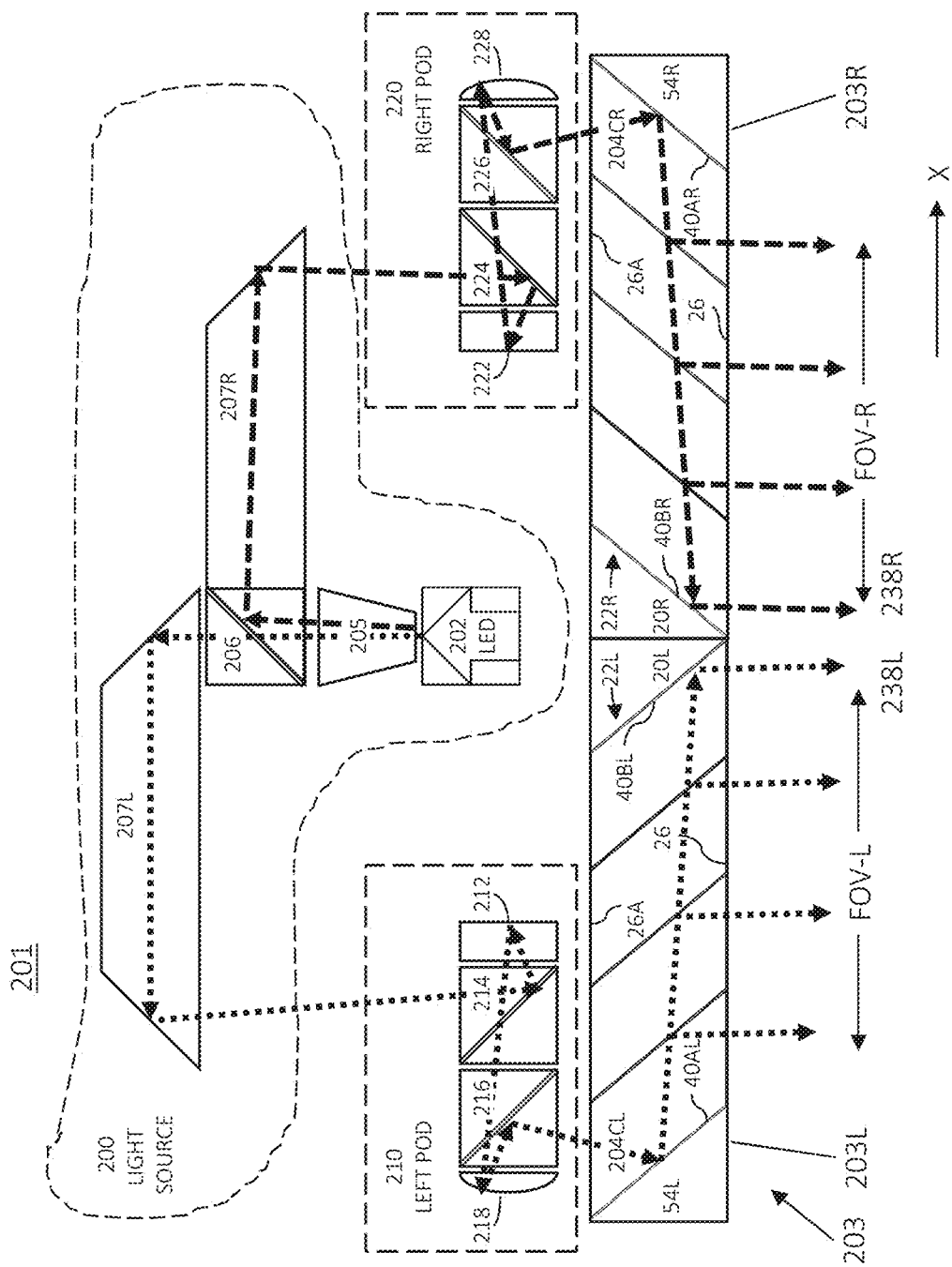
FIG. 17 is a schematic representation of a dual image projector assembly for use with the optical systems of FIGS. 14A-16E.
Figure 18:
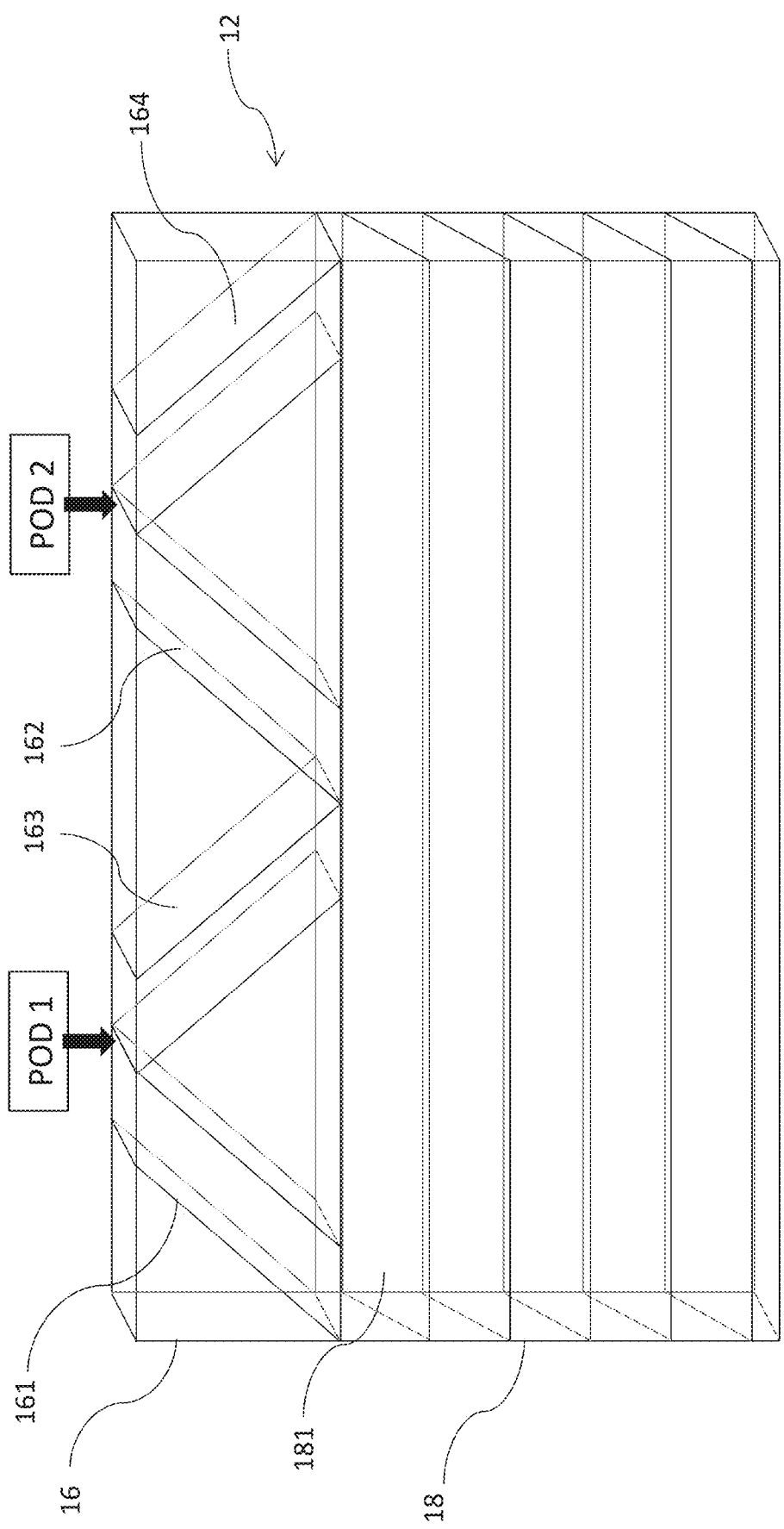
FIG. 18 is an enlarged schematic isometric view of a variant implementation of the LOE from the optical system of FIG. 14A in which the optical aperture expansion component for each image projector employs two sets of partially-reflecting surfaces.
Figure 19A:
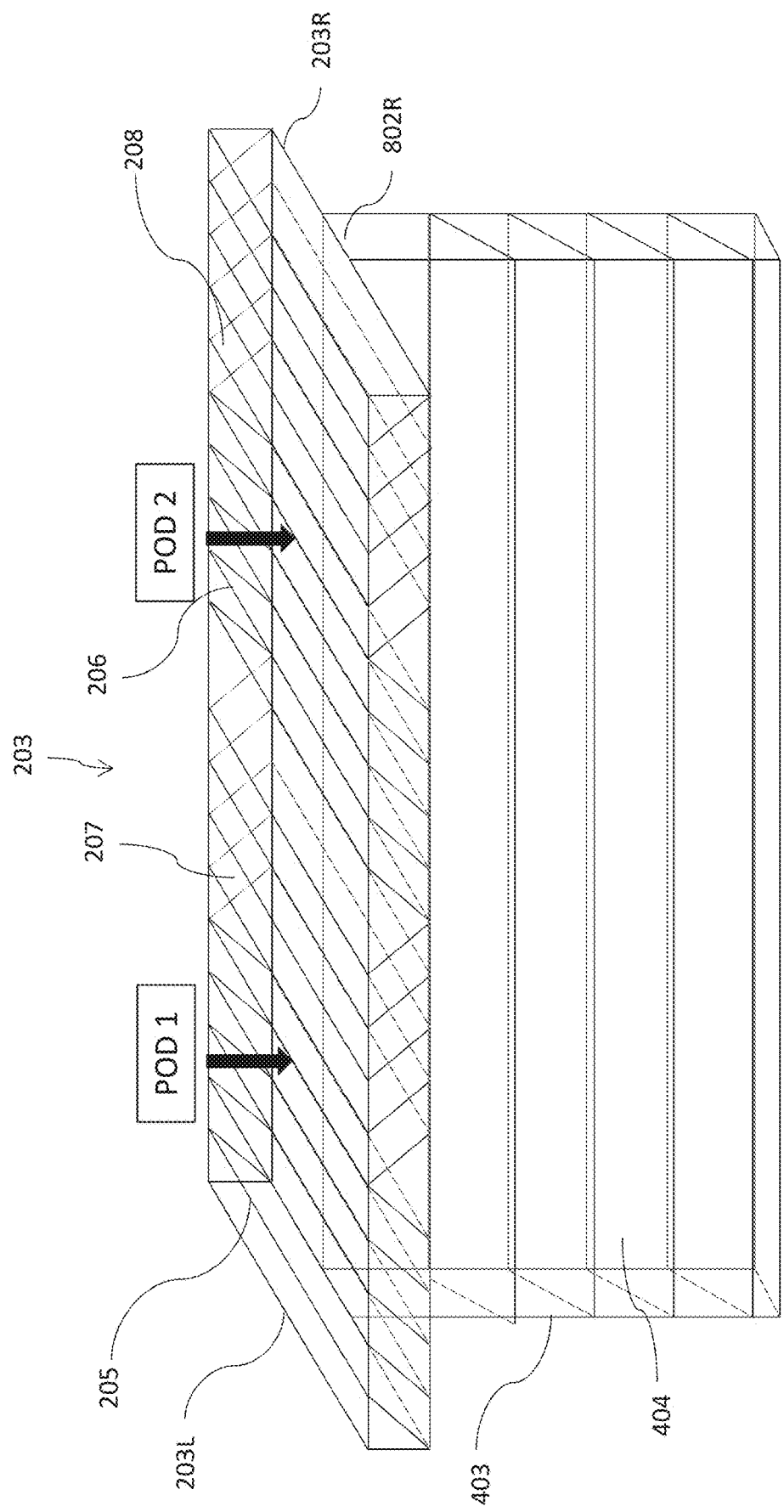
FIGS. 19A-19C are isometric views of variants of the optical system of FIG. 16A in which the optical aperture expansion component for each image projector employs two sets of partially-reflecting surfaces, and illustrating three options for optical coupling of the optical aperture expansion components to the LOE.
Figure 19B:
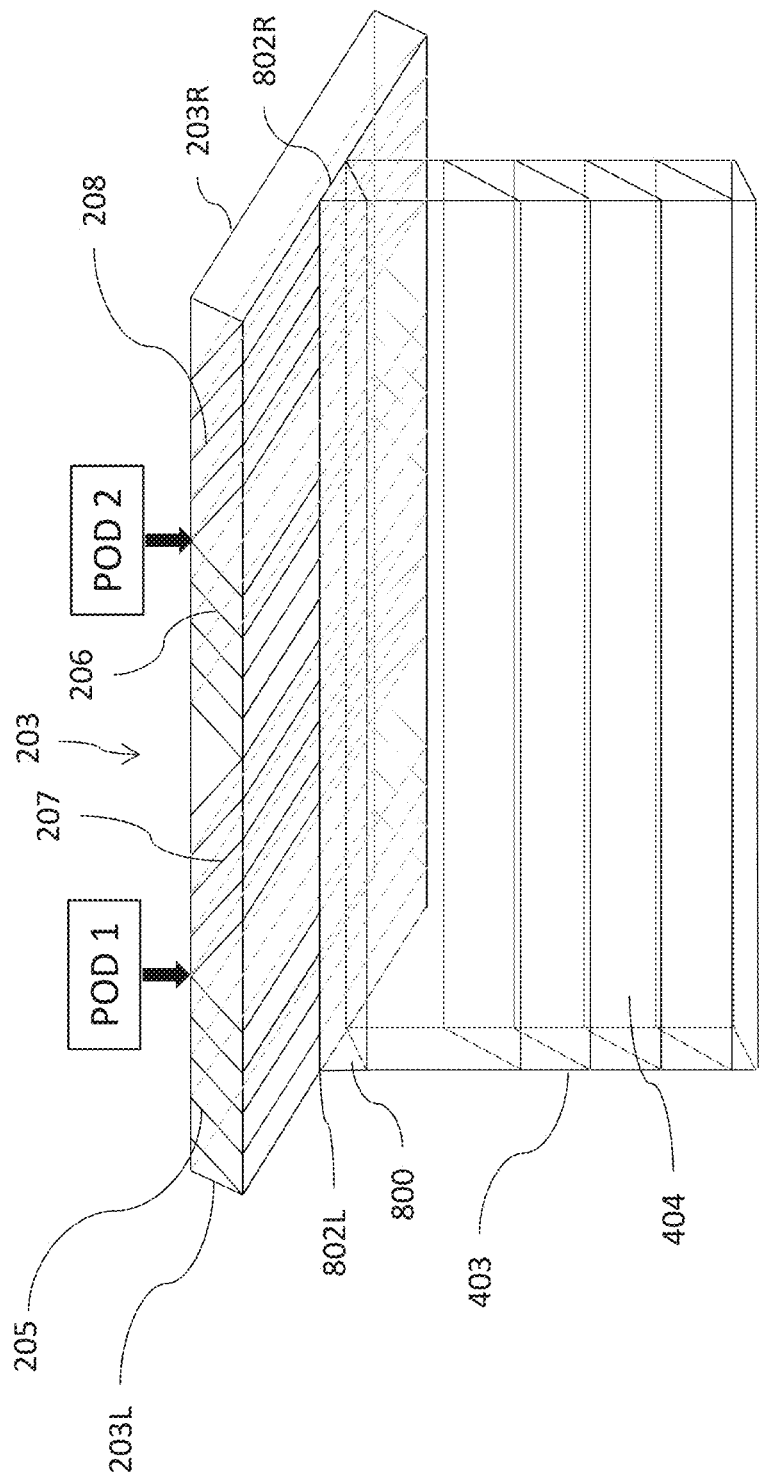
Figure 19C:
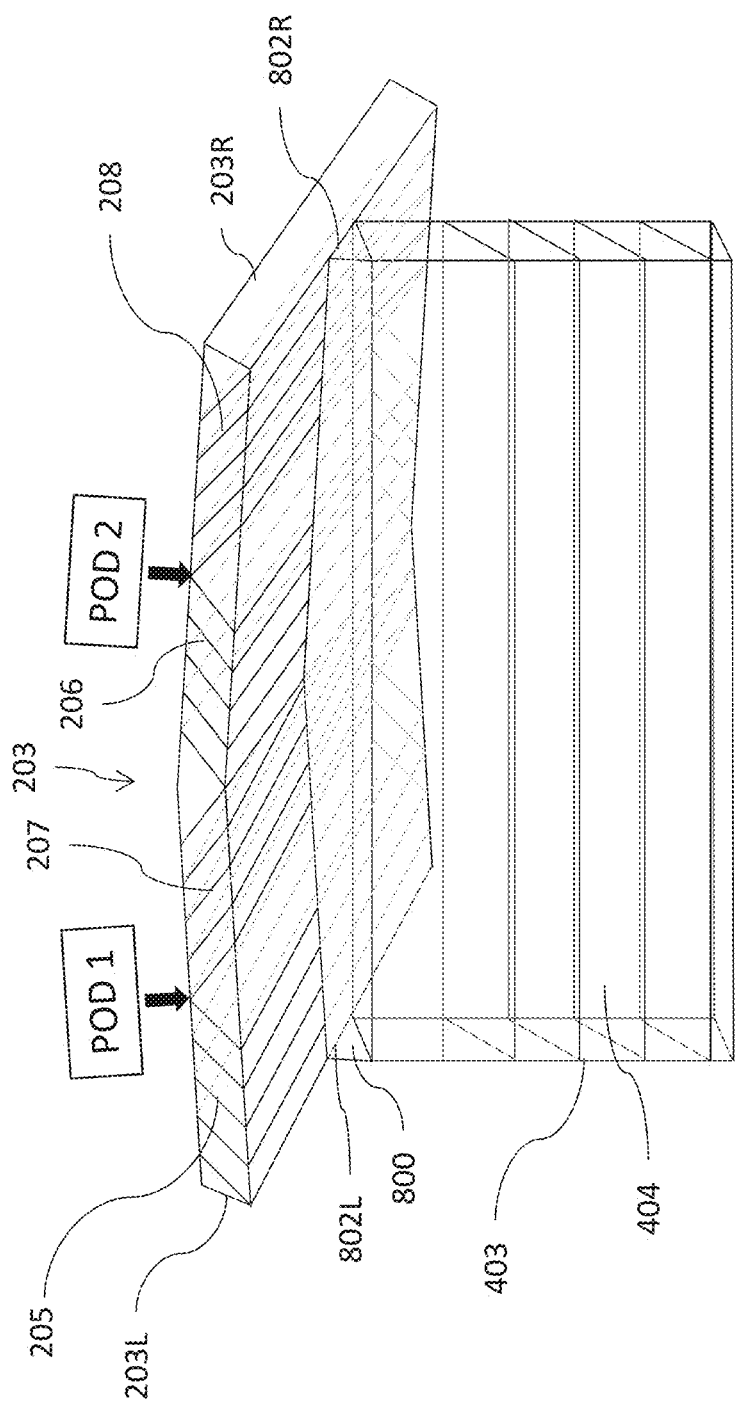

Referring to FIG. 17, there is shown an exemplary implementation of a system for light expansion 201 including two optical aperture expansion components 203L and 203R, integrated into a single slab element 203 for expanding the optical aperture of two image projectors 210, 220 for injection into an LOE (not shown in this view). The optical aperture expansion components expand the effective aperture of the two image projectors for subsequent injection into the LOE for display to a user. In the current figure, the view is from the edge of the optical aperture expansion components. The aperture expansion structures can be symmetric and can include mirrors on the sides, or more generally outside the field of view.

FIG. 17 illustrates non-limiting details of a possible implementation of the image projectors, suitable for use in any and all of the dual-POD implementations described herein. In the non-limiting example illustrated here, a common light source, e.g., LED light source 202, is provided to illuminate both image projectors, as part of an exemplary light source configuration 200, illuminating two "PODs" (micro-display projectors), a left POD 210 and a right POD 220. Note, the use of "left" and "right" throughout the current description is for ease and clarity of reference, and is not limiting, such as to direction or position. Each POD typically provides roughly half an original image (original image not shown), and provides a left collimated image 204CL and right collimated image 204CR to respective aperture expansion components 203L and 203R. The two collimated images 204C propagate along the x-axis, expand in the aperture expansion components, and are projected out of the aperture expansion components into the LOE 403, shown as main rays left coupled-out ray 238L and right coupled-out ray 238R. As shown in the other figures, the left and right coupled-out rays (238L, 238R) traverse LOE 403 and are coupled-out of the single LOE 403 at out-coupling partially-reflecting surfaces 404 along the z-axis as out-coupling rays (left out-coupling ray 38L and right out-coupling ray 38R) in the direction of the user (user's eye).

The exemplary light source 200 typically includes a light 202 provided by one or more LED or other source as is known in the art, and typically rapidly switchable between red, green and blue illumination to illuminate successive color image separations together making up a single "frame" of an image to be projected. The light 202 is typically expanded by an expander 205, can then be split by, for example, polarization-selective reflectors (PBS) 206 into two beams (shown as left dotted line and right dashed line), to propagate via corresponding light pipes (left light pipe 207L and right light pipe 207R) to the respective left POD 210 and right POD 220.

Each of the exemplary PODs (the left POD 210 and the right POD 220) inputs a respective beam of light (left beam and right beam) that transverses the POD via PBSs (left PBS 214, right PBS 224) to impinge on a display device (left display device 212 and right display device 222). Images can be obtained from each of the display devices (212, 222), either directly from a spatial light modulator (SLM), such as a cathode ray tube (CRT), a liquid crystal display (LCD), a liquid crystal on silicon (LCoS), a digital micro-mirror device (DMD), an OLED display, a scanning source or similar devices, or indirectly, by means of a relay lens or an optical fiber bundle. Images from each display device (212, 222) are typically roughly half of the entire image to be displayed, as described below in reference to FIG. 14B. Each half image propagates, respectively in the PODS (210, 220) via PBSs (left PBS 214, left PBS 216, and right PBS 224, and right PBS 226), is collimated by collimators (left collimator 218 and right collimator 228), and is output from the PODs (210, 220) as collimated images (left collimated image 204CL and right collimated image 204CR) into the respective aperture expanding components 203L and 203R.

The exemplary description of the light source 200 and PODs (210, 220) is non-limiting. Based on this description, one skilled in the art will be able to implement other light and image sources. For example, each POD could use a different section of a single LCOS, and each POD could have a separate, individual LED.

Each of the respective aperture expanding components 203L and 203R includes a first region (left first region 54L and right first region 54R) at which respective collimated images (left collimated image 204CL and right collimated image 204CR) are coupled into the substrates. Each of the respective aperture expanding components includes a respective waveguide (left waveguide 20L, and right waveguide 20R), also referred to as a "planar substrate" and a "light-transmitting substrate." Each of the waveguides (20L, 20R) includes at least two (major) surfaces parallel to each other, shown in the current figure as a lower (major) surface 26 and an upper (major) surface 26A. Each of the waveguides (20L, 20R) includes a respective set of facets (left facets 22L, right facets 22R), which are shown as double-lines, between the first two surfaces (26, 26A). Each set of facets (22L, 22R) includes a first facet (left first facet 40AL, right first facet 40AR) on a side of the facets closest to the first region (54L, 54R) where the collimated images (204CL, 204CR) are coupled into the substrates (20L, 20R). Similarly, each set of facets (22L, 22R) includes a last facet (left last facet 40BL, right last facet 40BR) on a distal side of the facets from the first region (54L, 54R). As the collimated light (204CL, 204CR) propagates in the sides (203L, 203R) of the respective aperture expanding components, the trapped propagating light is gradually coupled out of the aperture expander 203 by the partially reflecting surfaces of the facets (22R and 22L) as left coupled-out rays 238L and right coupled-out rays 238R. The areas in which the rays are coupled out of the sides of the aperture expanding components (203L, 203R) into the single LOE 403 are shown as respective fields of view (FOV) (left field of view FOV-L and a right field of view FOV-R). The above-described configuration of the aperture expanding components allows high-reflectivity surfaces or mirrors to be used in certain positions, since these surfaces are not in the user's FOV. For example, the first facets (40AL, 40AR) and last facets (40BL, 40BR) can be 100% reflecting.

The use of two separate PODs to inject different parts of an overall field of view may provide any of a number of advantages, including but not limited to, achieving an enhanced field of view, and allowing a reduction in the size and weight of the PODs compared to what would be required for a single POD providing the entire image.

Each POD will project roughly half of the beams of the image. For example, for a 55.5° (degree) FOV system with 16/9 aspect ratio, usually a single POD would project beams of 48.44° horizontally and 27.22° vertically.

Splitting the FOV in the horizontal direction by using the aperture expanding components as described will result in two PODs each handling a 24.22°×27.22° FOV. As mentioned above, some overlapping is preferred between the two PODs. If each POD overlaps by 3° then each POD will project 27.22°×27.22° degrees, where 3 degrees are overlapping. The image (picture) can be divided into the two display devices (212, 222) in each of the respective two PODs (210, 220) with part of the information common to the two PODs. The concept of division into two PODs may be more fully understood by reference to FIGS. 16A-16D, which include simulated ray traces. Each POD is assumed to have its own SLM (LCOS in this example), and may have its own or a shared illumination system.

Figure 16A:
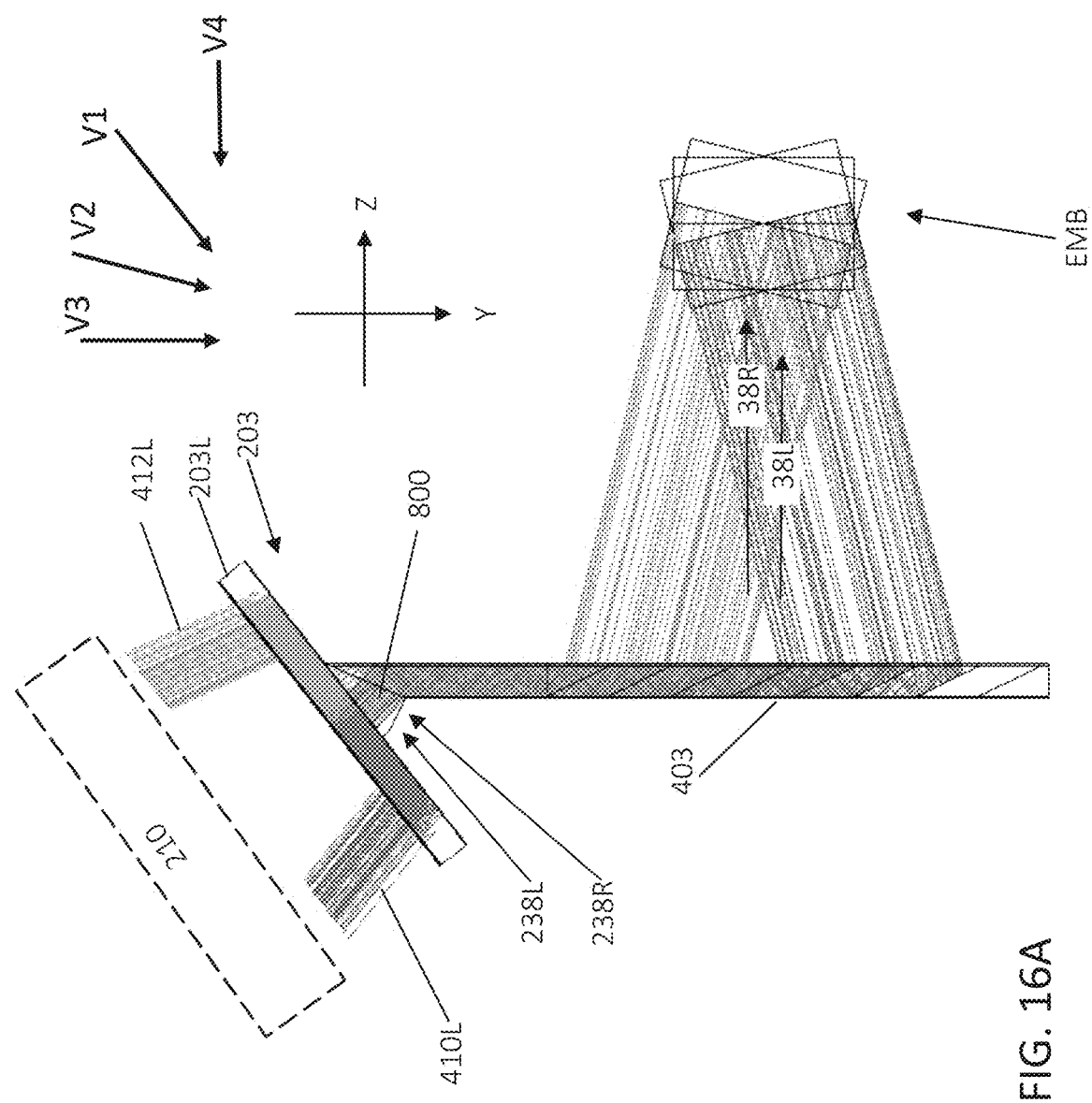
FIG. 16A is a side view of an alternative implementation of an optical system according to an aspect of the present invention, where a first expansion of an optical aperture is performed using aperture expanding components external to the LOE.

FIGS. 16B, 16C, 16D and 16E correspond to views along viewing directions V1, V2, V3 and V4, respectively, as illustrated in FIG. 16A.

Figure 16B:
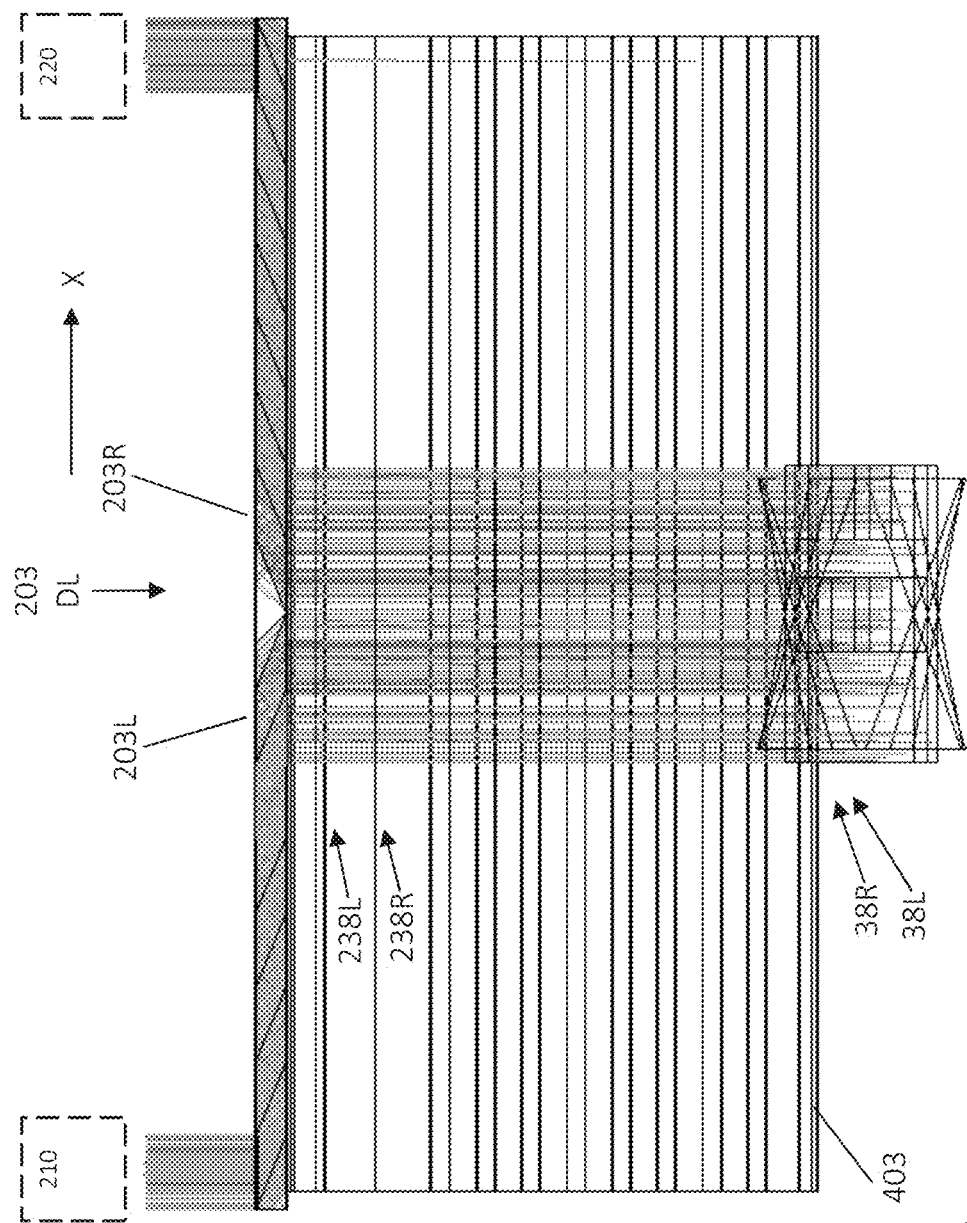
FIGS. 16B-16E are views of the optical system of FIG. 16A taken along the viewing directions marked V1, V2, V3 and V4 of FIG. 16A, respectively.
Figure 16C:
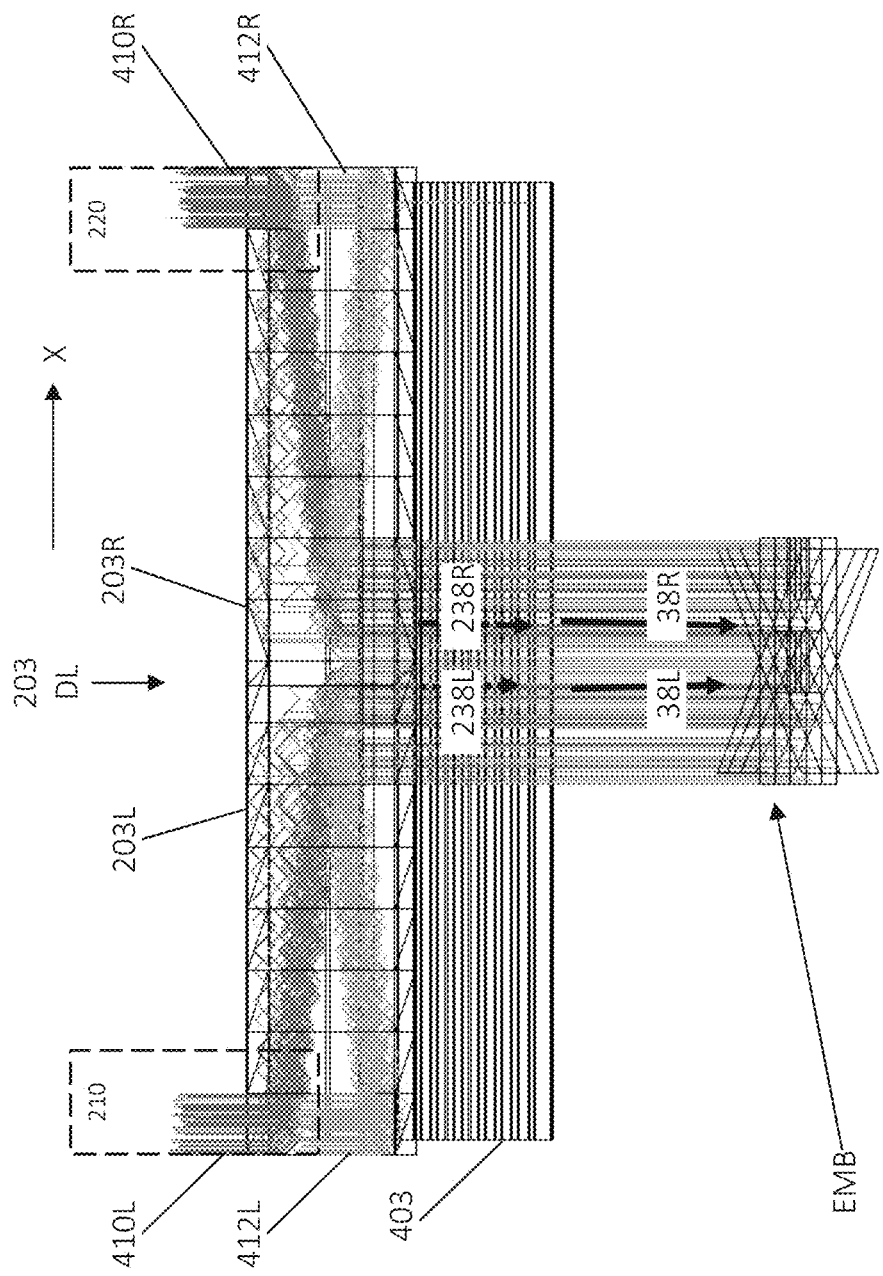

Referring to FIG. 16C, there is shown a sketch of the system 201 from a top angle, where the single LOE 403 is partially visible (at an angle) below the aperture expander 203. The left POD 210 is shown providing left collimated image 204CL to the aperture expanding component 203L, with rays of the left collimated image 204CL shown as a left first edge 410L and left second edge 412L of the image. Rays of the left first and second edges (410L, 412L) are shown propagating via the aperture expanding component 203L, coupling out as left coupled-out rays 238L into the single LOE 403 which then couples out the left out-coupling ray 38L toward the EMB.

Similarly, the right POD 220 is shown providing right collimated image 204CR to the aperture expanding component 203R, with rays of the right collimated image 204CR shown as a right first edge 410R and right second edge 412R of the image. Rays of the right first and second edges (410R, 412R) are shown propagating via the aperture expanding component 203R, coupling out as right coupled-out rays 238R into the single LOE 403 which then couples out the right out-coupling ray 38RL toward the EMB.

The propagating rays are unified in the single LOE 403 to the human eye position (EMB) denoted by the squared detectors.

Figure 16D:
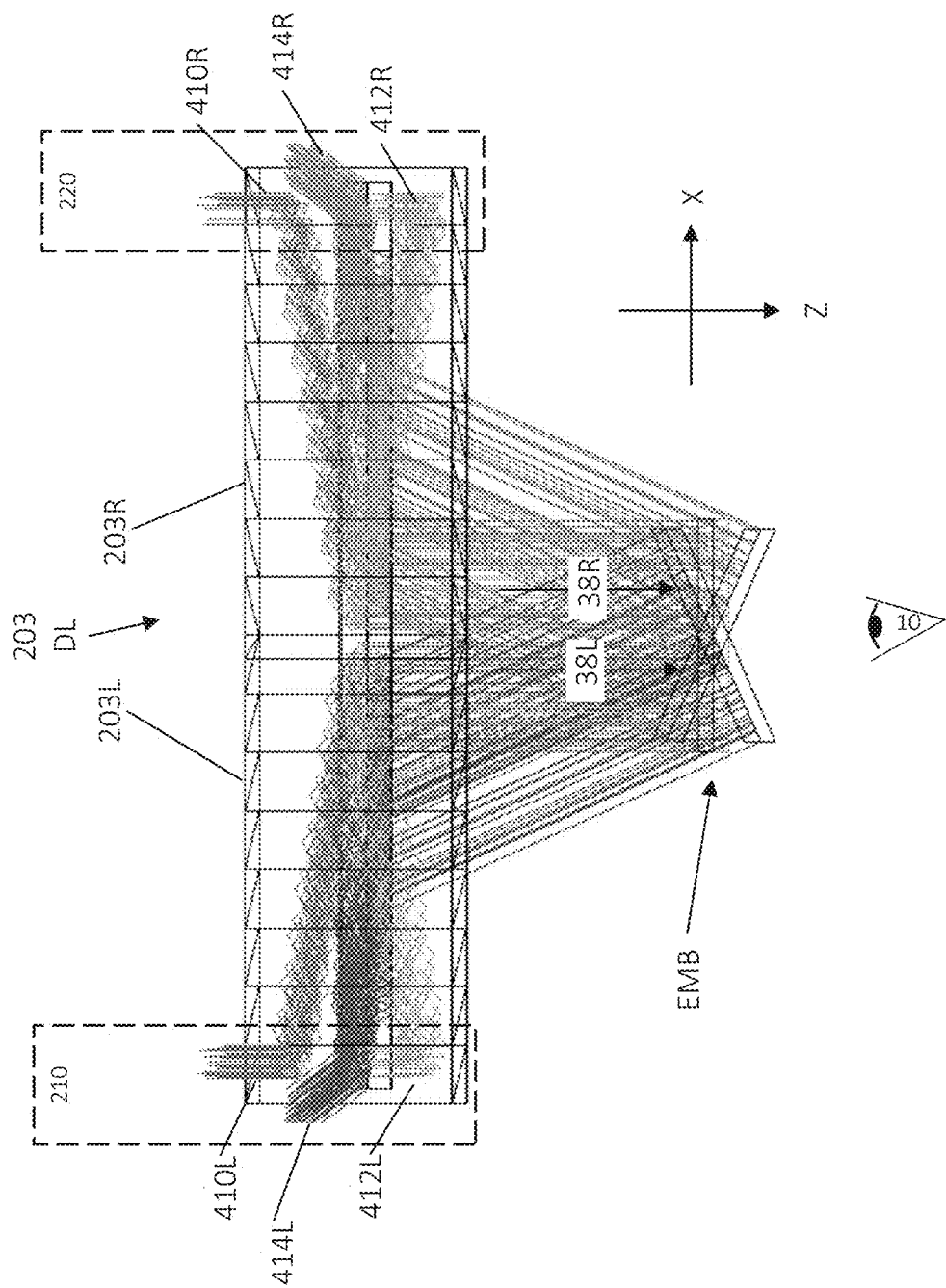
Figure 16E:
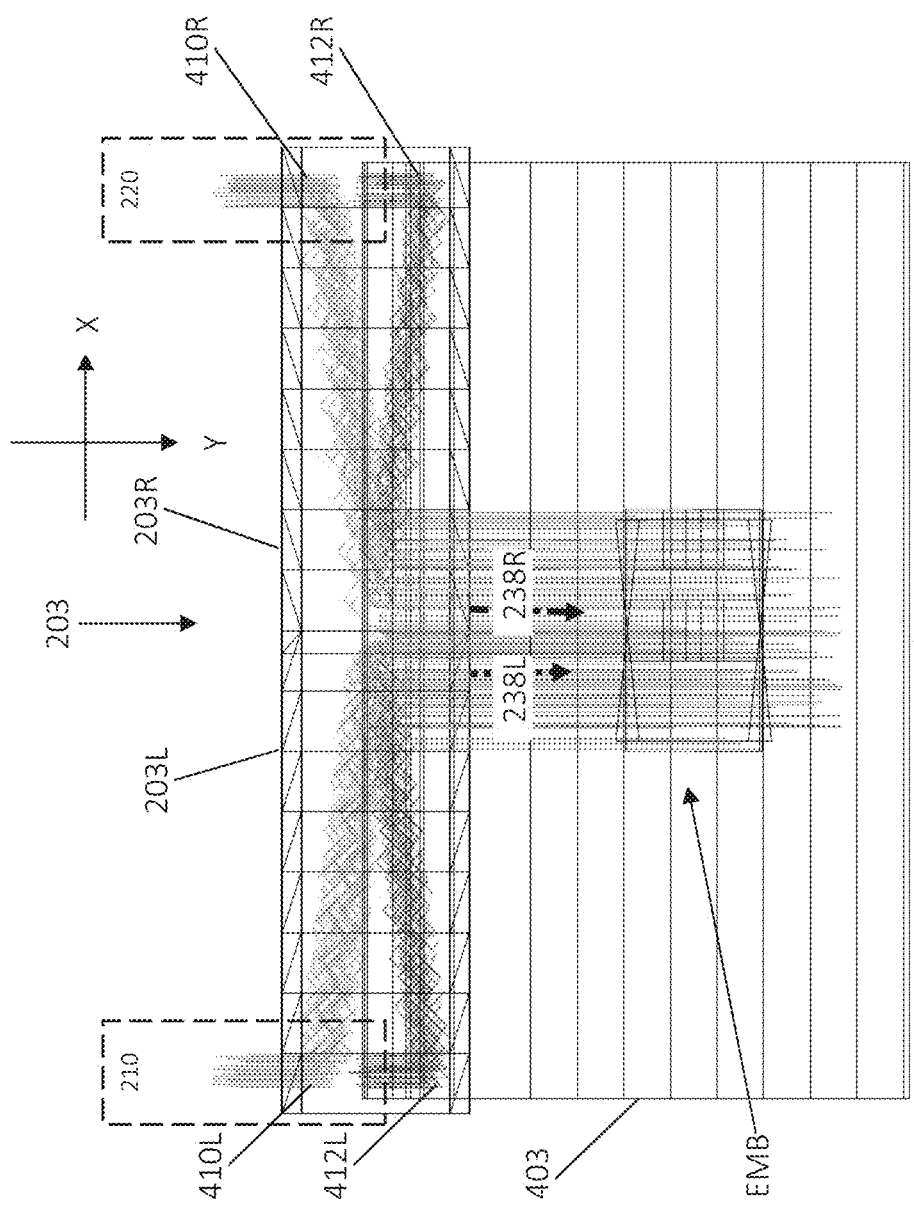

Referring to FIG. 16E, there is shown a sketch of the system 201 from a front view, where the single LOE 403 is visible below the aperture expander 203. The z-axis is coming "out of the page", so the out-coupling rays (left out-coupling ray 38L and right out-coupling ray 38R) are coming "out of the page", toward the user's eye 10, and are not shown in this figure.

Referring to FIG. 16D, there is shown a sketch of the system 201 from a top view, where the single LOE 403 is not visible (below the aperture expander 203). The out-coupling rays (left out-coupling ray 38L and right out-coupling ray 38R) are along the z-axis (toward the bottom as shown), toward the EMB and the user's eye 10. In this view, additional beams left third beam 414L and right third beam 414R are illustrated, showing the left and right extremities of the field-of-view near the center-line of the height of the image.

Referring to FIG. 16A, there is shown a sketch of the system 201 from a side view, the left side, with propagation along the y-axis and z-axis. From this view, it is apparent that the illustrated beams 410L and 412L correspond to the lower-most and upper-most extremities of the image field-of-view, but in the center of the field horizontally (as is clear from FIGS. 16B and 16C). A wedge 800 is used to connect the aperture expander 203 to the single LOE 403. The wedge 800 is a non-limiting example of one type of connection that can be used between the aperture expander 203 and single LOE 403. Other devices and configurations can be used to provide a desired angle and connection, depending on the specific requirements of the implementation.

Referring to FIG. 16B, there is shown a sketch of the system 201 from above at a 45-degree angle to the plane of the single LOE (the y-axis). The single LOE 403 is visible below the aperture expander 203. The z-axis is coming "out of the page", so the out-coupling rays (left out-coupling ray 38L and right out-coupling ray 38R) are coming "out of the page", toward the user's eye 10, and the location is indicated in the figure.

Figure 20C:
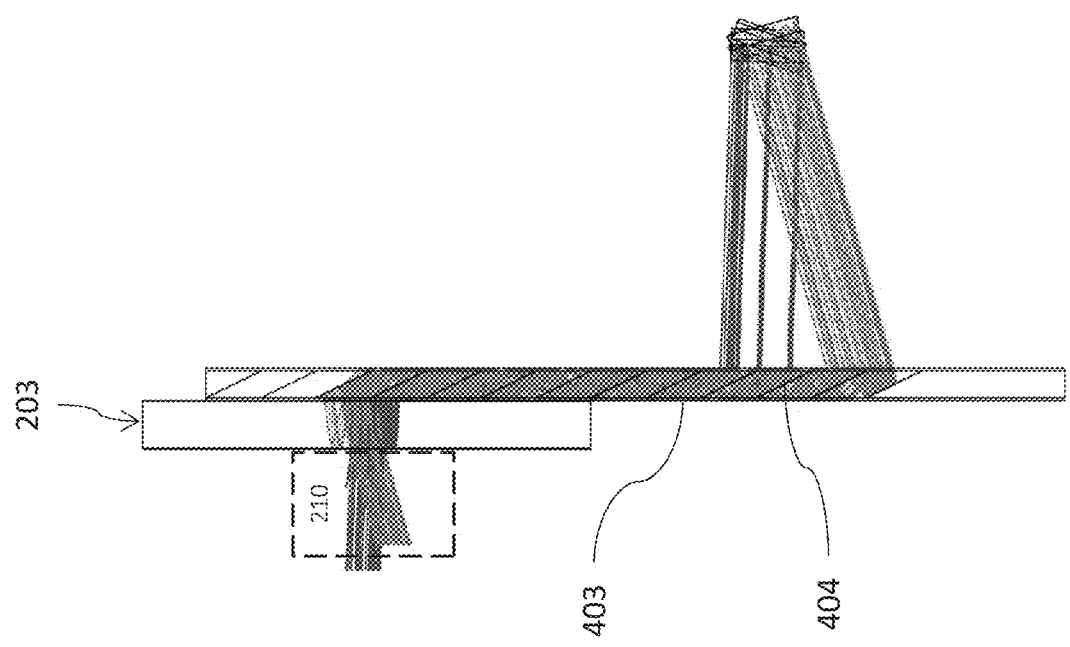
Figure 22A:
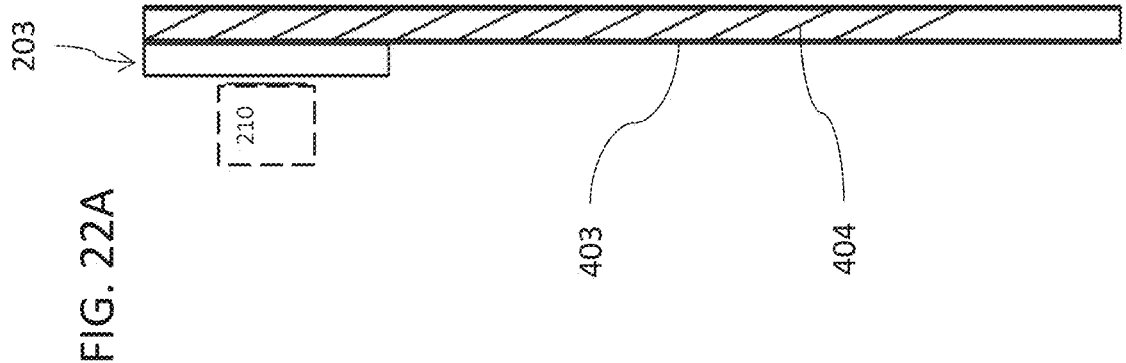
Figure 21C:
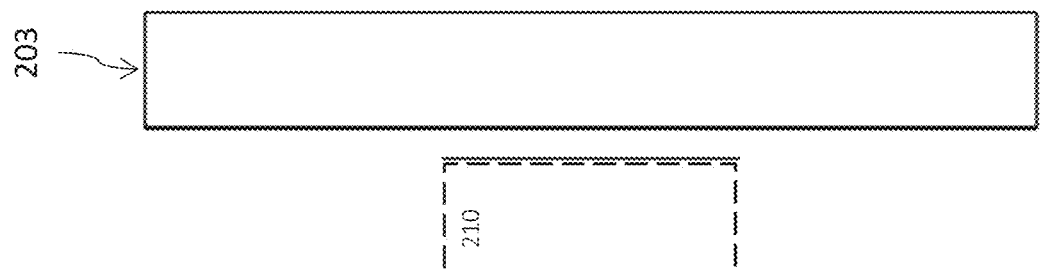

Referring now to FIGS. 20A-22C, these illustrate an alternative coupling-in configuration according to which the aperture expanding components are optically associated with a coupling-in surface which is coplanar with, or parallel to, one of the major external surfaces of LOE 403. In this case, at least one internal reflecting surface within LOE 403 is used for coupling-in the image illumination so as to propagate within LOE 403 by internal reflection. According to certain particularly preferred implementations, the coupling-in is achieved using a set of mutually-parallel partially-reflecting coupling-in surfaces. FIGS. 20A-20C illustrate an implementation according to this approach employing a single set of partially-reflecting surfaces for each of the aperture-expanding components, while FIGS. 21A-21C illustrate aperture-expanding components employing two sets of partially-reflecting surfaces for each image projector, with asymmetric inclination of the facets relative to the major planes of the device. FIGS. 22A-22C illustrate an optical system employing the aperture expanding components of FIGS. 21A-21C. The use of asymmetric inclination of the facets may enhance the performance and compactness of the system. As seen in this system, the pod needed to fill the entire EMB is relatively small though the FOV of the displayed light is very big.

In this example, and throughout this document, it should be noted that each set of partially reflective internal surfaces ("facets") may have either uniform or non-uniform spacing, and may extend across the entire thickness dimension of the aperture expanding component (between the two major parallel external surfaces) or across only a part of that thickness dimension.

All of the above principles can also be applied to "sideway" configurations, where an image is injected from a POD located laterally outside the viewing area and is spread by a first set of facets vertically and then by a second set of facets horizontally for coupling into the eye of the user. All of the above-described configurations and variants should be understood to be applicable also in a side-injection configuration.

Throughout the above description, reference has been made to the X axis and the Y axis as shown, where the X axis is either horizontal or vertical, and corresponds to the first dimension of the optical aperture expansion, and the Y axis is the other major axis corresponding to the second dimension of expansion. In this context, X and Y can be defined relative to the orientation of the device when mounted on the head of a user, in an orientation which is typically defined by a support arrangement, such as the aforementioned glasses frame of FIGS. 1A and 1B. Other terms which typically coincide with that definition of the X axis include: (a) at least one straight line delimiting the eye-motion box, that can be used to define a direction parallel to the X axis; (b) the edges of a rectangular projected image are typically parallel to the X axis and the Y axis; and (c) a boundary between the first region 16 and the second region 18 typically extends parallel to the X axis.

It will be appreciated that the above descriptions are intended only to serve as examples, and that many other embodiments are possible within the scope of the present invention as defined in the appended claims.

What is claimed is:

1. An optical system for delivering an output image to an eye-motion box for viewing by an eye of a user, the optical system comprising:
   a light-guide optical element (LOE) formed from transparent material, said LOE comprising an out-coupling set of planar, mutually-parallel, partially-reflecting surfaces and a set of mutually-parallel major external surfaces, said out-coupling set of partially-reflecting surfaces being located between said major external surfaces;
   a first image projector configured to project first collimated image light corresponding to a first part of the output image from a first optical aperture, the first collimated image light following a first light path from said optical aperture into said LOE so as to propagate within said LOE by internal reflection at said major external surfaces and to be progressively coupled-out from said LOE by said out-coupling set of partially-reflecting surfaces towards the eye-motion box;
   a second image projector configured to project second collimated image light corresponding to a second part of the output image from a second optical aperture, the second collimated image light following a second light path from said optical aperture into said LOE so as to propagate within said LOE by internal reflection at said major external surfaces and to be progressively coupled-out from said LOE by said out-coupling set of partially-reflecting surfaces towards the eye-motion box, said first and second parts of the collimated image combining at the eye-motion box to provide the output image;
   a first optical expansion component comprising a first set of planar, mutually-parallel, partially-reflecting surfaces having a first orientation, said first optical expansion component being deployed in said first light path so as to expand an effective optical aperture of said first image projector and to direct the first collimated image light towards said out-coupling set of partially-reflecting surfaces; and
   a second optical expansion component comprising a second set of planar, mutually-parallel, partially-reflecting surfaces having a second orientation, said second optical expansion component being deployed in said second light path so as to expand an effective optical aperture of said second image projector and to direct the second collimated image light towards said out-coupling set of partially-reflecting surfaces.

2. The optical system of claim 1, wherein said first optical expansion component and said second optical expansion component are external components optically coupled to said LOE, and wherein injection of said image illumination from said first and second image projectors into said LOE occurs through said first and second optical expansion components, respectively.

3. The optical system of claim 2, wherein said first and second optical expansion components are each implemented in a slab having two major surfaces, wherein one of said major surfaces is optically coupled to a coupling-in surface associated with said LOE.

4. The optical system of claim 3, wherein said coupling-in surface is obliquely angled relative to said major external surfaces of said LOE.

5. The optical system of claim 3, wherein said slab of said first optical expansion component is optically coupled to a first coupling-in surface associated with said LOE and said slab of said second optical expansion component is optically coupled to a second coupling-in surface associated with said LOE, said first and second coupling-in surfaces being non-coplanar.

6. The optical system of claim 3, wherein said coupling-in surface is coplanar with, or parallel to, one of said major external surfaces of said LOE, and wherein said LOE includes at least one at least partially reflecting coupling-in surface.

7. The optical system of claim 1, wherein said first set of partially-reflecting surfaces and said second set of partially-reflecting surfaces are located within said LOE between said major external surfaces of said LOE.

8. The optical system of claim 7, wherein said first and second sets of partially-reflecting surfaces are perpendicular to said major external surfaces of said LOE.

9. The optical system of claim 7, wherein said first and second sets of partially-reflecting surfaces are oblique to said major external surfaces of said LOE.

10. The optical system of claim 1, wherein said first optical expansion component further comprises a third set of mutually-parallel partially-reflecting surfaces non-parallel to said first set of partially-reflecting surfaces, said first and third sets of partially reflecting surfaces expanding the optical aperture of said first image projector in opposite directions and directing the image light towards said out-coupling set of partially-reflecting surfaces.

11. The optical system of claim 10, wherein said first image projector has a central optical axis, and wherein said third set of partially-reflecting surfaces has an inclination relative to said central optical axis different from an inclination of said first set of partially-reflecting surfaces to said central axis.

* * * * *